(12) United States Patent
Mirtich et al.

(10) Patent No.: US 7,545,949 B2
(45) Date of Patent: Jun. 9, 2009

(54) METHOD FOR SETTING PARAMETERS OF A VISION DETECTOR USING PRODUCTION LINE INFORMATION

(75) Inventors: Brian V. Mirtich, Medfield, MA (US); William M. Silver, Weston, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 764 days.

(21) Appl. No.: 10/979,535

(22) Filed: Nov. 2, 2004

(65) Prior Publication Data

US 2005/0275728 A1 Dec. 15, 2005

Related U.S. Application Data

(63) Continuation-in-part of application No. 10/865,155, filed on Jun. 9, 2004.

(51) Int. Cl.
*G06K 9/00* (2006.01)

(52) U.S. Cl. .................. 382/100; 382/103; 382/104; 382/107; 382/101; 382/141; 382/143; 382/162; 348/211.99

(58) Field of Classification Search .......... 382/100, 382/103, 104, 107, 101, 141, 143, 162; 348/211.99
See application file for complete search history.

(56) References Cited

U.S. PATENT DOCUMENTS

| | | | |
|---|---|---|---|
| 5,164,998 A * | 11/1992 | Reinsch ............ 382/100 |
| 5,184,217 A | 2/1993 | Doering |
| 5,481,712 A | 1/1996 | Silver et al. |
| 5,717,834 A | 2/1998 | Werblin et al. |
| 5,734,742 A | 3/1998 | Asaeda |
| 5,802,220 A | 9/1998 | Black et al. |
| 5,943,432 A | 8/1999 | Gilmore et al. |
| 5,960,097 A | 9/1999 | Pfeiffer et al. |
| 6,046,764 A | 4/2000 | Kirby et al. |
| 6,049,619 A | 4/2000 | Anandan et al. |
| 6,072,494 A | 6/2000 | Nguyen |
| 6,072,882 A | 6/2000 | White et al. |
| 6,173,070 B1 | 1/2001 | Michael et al. |
| 6,175,644 B1 | 1/2001 | Scola et al. |
| 6,184,924 B1 | 2/2001 | Schneider et al. |

(Continued)

FOREIGN PATENT DOCUMENTS

EP 0815688 5/2000

(Continued)

OTHER PUBLICATIONS

Chen, Y. H., "Computer Vision for General Purpose Visual Inspection: a Fuzzy Logic Approach", *Optics and Lasers in Engineering 22*, Elsevier Science Limited, vol. 22, No. 3, (1995), pp. 182-192.

(Continued)

*Primary Examiner*—Matthew C Bella
*Assistant Examiner*—Mike Rahmjoo

(57) ABSTRACT

Disclosed are systems and methods for setting various operating parameters of a vision detector from production line information that can be supplied by a manufacturing technician who is not skilled in the art of the invention. These operating parameters include shutter time, video gain, idle time, frame count, and locator search range. The production line information includes line speed, field of view size, direction of motion, and object spacing.

4 Claims, 10 Drawing Sheets

U.S. PATENT DOCUMENTS

| | | | |
|---|---|---|---|
| 6,282,462 | B1 | 8/2001 | Hopkins |
| 6,285,787 | B1 | 9/2001 | Kawachi et al. |
| 6,346,966 | B1 | 2/2002 | Toh |
| 6,396,949 | B1 | 5/2002 | Nichani |
| 6,487,304 | B1 | 11/2002 | Szeliski |
| 6,525,810 | B1 | 2/2003 | Kipman |
| 6,526,156 | B1 | 2/2003 | Black et al. |
| 6,539,107 | B1 | 3/2003 | Michael et al. |
| 6,549,647 | B1 | 4/2003 | Skunes et al. |
| 6,597,381 | B1 | 7/2003 | Eskridge et al. |
| 6,628,805 | B1 | 9/2003 | Hansen et al. |
| 6,741,977 | B1 | 5/2004 | Nagaya et al. |
| 6,987,528 | B1 | 1/2006 | Nagahisa et al. |
| 7,088,387 | B1 | 8/2006 | Freeman et al. |
| 2002/0005895 | A1 | 1/2002 | Freeman et al. |
| 2002/0177918 | A1* | 11/2002 | Pierel et al. ................. 700/124 |
| 2002/0196342 | A1 | 12/2002 | Walker et al. |
| 2003/0113018 | A1 | 6/2003 | Nefian et al. |
| 2003/0137590 | A1 | 7/2003 | Barnes et al. |
| 2004/0148057 | A1 | 7/2004 | Breed et al. |
| 2004/0218806 | A1 | 11/2004 | Miyamoto et al. |
| 2006/0146377 | A1 | 7/2006 | Marshall et al. |
| 2006/0223628 | A1 | 10/2006 | Walker et al. |
| 2007/0009152 | A1 | 1/2007 | Kanda |
| 2008/0166015 | A1 | 7/2008 | Haering et al. |

FOREIGN PATENT DOCUMENTS

| | | |
|---|---|---|
| EP | 0815688 B1 | 5/2000 |
| WO | WO 96/09597 | 3/1996 |

OTHER PUBLICATIONS

Di Mauro, E. C., et al., "Check—a generic and specific industrial inspection tool", *IEE Proc.-Vis. Image Signal Process.*, vol. 143, No. 4,(Aug. 27, 1996),pp. 241-249.

National Instruments, "IMAQVision Builder Tutorial", *IMAQ* XP-002356530, http://www.ni.com/pdf/manuals/322228c.pdf,(Dec. 2000).

"CCD/CMOS Sensors Spot Niche Application", *PennWell Corporation*, Vision System Design—Imaging and Machine Vision Technology,(2004).

"iQ 180", *Adaptive Optics Associates* 900 Coles Road Blackwood, NJ 08012-4683, (Dec. 2003).

"Laser Scanning Product Guide", *Adaptive Optics Associates—Industrial Products and Systems* 90 Coles Road Blackwood, NJ 08012, Industrial Holographic and Conventional Laser 1D, Omnidirectional Bar Codes Scanners,(Mar. 2003).

"Matsushita Imagecheckers", *NAiS Machine Vision—Matsushita Machine Vision Systems*, (2003).

"Matsushita LightPix AE10", *NAiS Machine Vision—Matsushita Machine Vision Systems*, (2003).

"Simatic Machine Vision", *Simatic VS 100 Series Siemens AG*, www.siemens.com/machine-vision,(Apr. 1, 2003).

"SmartCapture Tool", *Feature Fact Sheet, Visionx Inc.*, www.visionxinc.com, (2003).

Asundi, A. , et al., "High-Speed TDI Imaging for Peripheral Inspection", *Proc. SPIE* vol. 2423, Machine Vision Applications in Industrial Inspection III, Frederick Y. Wu; Stephen S. Wilson; Eds.,(Mar. 1995),189-194.

Baillard, C. , et al., "Automatic Reconstruction of Piecewise Planar Models from Multiple Views", *CVPR*, vol. 02, No. 2,(1999),2559.

Baumberg, A. M. , et al., "Learning Flexible Models from Image Sequences", *University of Leeds, School of Computer Studies, Research Report Series, Report 93.36*, (Oct. 1993),pp. 1-13.

Chang, Dingding , et al., "Feature Detection of Moving Images using a Hierarchical Relaxation Method", *IEICE Trans. Inf. & Syst.*, vol. E79-D, (Jul. 7, 1996).

Corke, Peter I., et al., "Real Time Industrial Machine Vision", *Electrical Engineering Congress* Sydney, Australia, CSIRO Division of Manufacturing Technology,(1994).

Demotte, Donald , "Visual Line Tracking", *Application Overview & Issues Machine Vision for Robot Guidance Workshop*, (May 5, 2004).

Kim, Zuwhan , et al., "Automatic Description of Complex Buildings with Multiple Images", *IEEE* 0-7695-0813-8/00, (2000),155-162.

Marsh, R , et al., "The application of knowledge based vision to closed-loop control of the injection molding process", *SPIE* vol. 3164, Faculty of Engineering University of the West of England United Kingdon,(1997),605-16.

Rohr, K. , "Incremental Recognition of Pedestrians from Image Sequences", *CVPR93*, (1993).

West, Perry C., "High Speed, Real-Time Machine Vision", *Imagenation and Automated Vision Systems, Inc.*, (2001).

Wilson, Andrew , "CMOS/CCD sensors spot niche applications", *Vision Systems Design*, (Jun. 2003).

Zarandy, Akos , et al., "Ultra-High Frame Rate Focal Plane Image Sensor and Processor", *IEEE Sensors Journal*, vol. 2, No. 6,(2002).

Zarandy, A. , et al., "Vision Systems Based on the 128×128 Focal Plane Cellular Visual Microprocessor Chips", *IEEE*, (Mar. 2003),III-518-III-521.

"ADSP-BF533 Blackfin Processor Hardware Reference", *Analog Devices Inc.—Media Platforms and Services Group*, Preliminary Revision—Part No. 82-002005-01, (Mar. 2003).

"Blackfin Processor Instruction Set Reference", *Analog Devices, Inc.*, Revision 2.0, Part No. 82-000410-14,(May 2003).

"LM9630 100×128, 580 fps UltraSensitive Monochrome CMOS Image Sensor", *National Semiconductor Corp.*, www.national.com Rev. 1.0,(Jan. 2004).

"Cellular device processes at ultrafast speeds", *VisionSystems Design*, (Feb. 2003).

"Cognex VisionPro", *Getting Started—QuickStart Tutorial*, Cognex Corporation, 590-6560, Revision 3.5,(May 2004),69-94.

Haering, N. , et al., "Visual Event Detection", *Kluwer Academic Publishers*, Chapter 2, Section 8,(2001).

IBM, "Software Controls for Automated Inspection Device Used to Check Interposer Buttons for Defects", *IP.com Journal*, IP.com Inc., West Henrietts, NY, US, (Mar. 27, 2003).

Uno, T. , et al., "A Method of Real-Time Recognition of Moving Objects and its Application", *Pattern Recognition; Pergamon Press*, vol. 8, pp. 201-208, (1976),pp. 201-208.

Shane C. Hunt, Mastering Microsoft PhotoDraw 2000, SYBEX, Inc., May 21, 1999.

Integrated Design Tools, High-Speed CMOS Digital Camera, X-Stream Vision User's Manual, 2000.

IO Industries, High Speed Digital Video Recording Software 4.0, IO industries, Inc.—Ontario, CA, 2002.

Phillip Kahn, Building Blocks for Computer Vision Systems, IEEE Expert, vol. 8, No. 6, XP002480004, pp. 40-50, Dec. 6, 1993.

Matrox, Interactive Windows Imaging Software for Industrial and Scientific Applications, Inspector 4.0—Matrox Imaging, pp. 8, Apr. 15, 2002.

Whelan, P. et al., Machine Vision Algorithms in Java, Chapter 1—An Introduction to Machine Vision, Springer-Verlag, XP002480005, 2001.

Cellular device processes at ultrafast speeds, VisionSystems Design, Feb. 2003.

Photron, USA, Product information for FASTCAM-X 1280 PCI, Copyright 2004, www.photron.com.

Photron, USA, Product information for FASTCAM PCI, Copyright 2004, www.photron.com.

Photron, USA, Product information for Ultima 1024, Copyright 2004, www.photron.com.

Photron, USA, Product information for Ultima 512, Copyright 2004, www.photron.com.

Wright, Anne, et al, Cognachrome Vision System User's Guide, Newton Research Labs, Manual Edition 2.0, Documents Software Version 26.0, Jun. 3, 1996.

Stemmer Imaging GmbH, Going Multimedia with Common Vision Blox, Product News, www.stemmer-imaging.de, http://www.imasys.fr/pages/news/item.php?view=319&item=313, Feb. 20, 2003.

Adaptive Optics Associates, Laser Scanning Product Guide, Industrial Products and Systems, Mar. 2003.

Cognex Corporation 3000/4000/5000 Image Processing, Revision 7.4 590-0135 Edge Detection Tool, 1996.

Cognex Corporation 4000/5000 SMD Placement Guidance Package, User's Manual, Release 3.8.00, Chapter 15, 1998.

Cognex Corporation, CVL Vision Tools Guide, Cognex MVS-8000 Series, Chapter 5, Symbol Tool, CVL 5.4, Dec. 1999.

Cordin Company, Electronic Imaging Systems, High Speed Imaging Solutions: 200-500 Series Cameras, www.cordin.com, 2004.

KSV Instruments Ltd., HiSIS 2002—High Speed Imaging System, copyright 1996-1998, http://www.changkyung.co.kr/ksv/hisis/highsp.htm.

Photron, USA, Product information for Ultima APX, Copyright 2004, www.photron.com.

Bi-i, Bio-inspired Real-Time Very High Speed Image Processing Systems, AnaLogic Computers Ltd., http://www.analogic-computers.com/cgi-bin/phprint21.php.2004.

Bi-i AnaLogic Computers Ltd., 2003.

RVSI, Smart Camera Reader for Directly Marked Data Matrix Codes, HawkEye 1515 with GUI, 2004.

Olympus Industrial, High Speed, High Quality Imaging Systems, i-speed Product Brochure - Publisher Olympus Industrial, 2002.

Olympus Industrial, Design Philosophy, i-speed, 2002.

ICS 100, Intelligent Camera Sensor, SICK Product Information, SICK Industrial Sensors, 6900 West 110th St., Minneapolis, MN 55438, www.sickusa.com, Jan. 3, 2002.

Denis, Jolivet, LabView and IMAQ Vision Builder Provide Automated Visual Builder, LabVIEW, National Instruments, XP002356529, http://www.ni.com/pdf/csma/us/JNDESWG.pdf, 2001.

CV-2100 Series, Keyence America, http://www.keyence.com/products/vision/cv_2100_spec.html, High-Speed Digital Machine Vision System, Dec. 29, 2003.

Stauffer, Chris et al., Tracking-Based Automatic Object Recognition, Artificial Intelligence Laboratory, Massachusetts Institute of Technology, Cambridge, MA http://www.ai.mit.edu, pp. 133-134, 2001.

* cited by examiner

METHOD FOR SETTING PARAMETERS OF A VISION DETECTOR USING PRODUCTION LINE INFORMATION

RELATED APPLICATION

This application is a continuation-in-part of co-pending U.S. patent application Ser. No. 10/865,155, entitled METHOD AND APPARATUS FOR VISUAL DETECTION AND INSPECTION OF OBJECTS, by William M. Silver, filed Jun. 9, 2004, the teachings of which are expressly incorporated herein by reference, and referred to herein as the "Vision Detector Method and Apparatus".

BACKGROUND OF THE INVENTION

1. Field of the Invention

The invention relates to automated detection and inspection of objects being manufactured on a production line, and more particularly to the related fields of industrial machine vision and automated image analysis.

2. Description of the Related Art

Industrial manufacturing relies on automatic inspection of objects being manufactured. One form of automatic inspection that has been in common use for decades is based on optoelectronic technologies that use electromagnetic energy, usually infrared or visible light, photoelectric sensors, and some form of electronic decision making.

One well-known form of optoelectronic automatic inspection uses a device that can capture a digital image of a two-dimensional field of view in which an object to be inspected is located, and then analyze the image and make decisions. Such a device is usually called a machine vision system, or simply a vision system. The image is captured by exposing a two-dimensional array of photosensitive elements for a brief period, called the integration or shutter time, to light that has been focused on the array by a lens. The array is called an imager and the individual elements are called pixels. Each pixel measures the intensity of light falling on it during the shutter time. The measured intensity values are then converted to digital numbers and stored in the memory of the vision system to form the image, which is analyzed by a digital processing element such as a computer, using methods well-known in the art to determine the status of the object being inspected.

In some cases the objects are brought to rest in the field of view, and in other cases the objects are in continuous motion through the field of view. An event external to the vision system, such as a signal from a photodetector, or a message from a PLC, computer, or other piece of automation equipment, is used to inform the vision system that an object is located in the field of view, and therefore an image should be captured and analyzed. Such an event is called a trigger.

Machine vision systems have limitations that arise because they make decisions based on a single image of each object, located in a single position in the field of view (each object may be located in a different and unpredictable position, but for each object there is only one such position on which a decision is based). This single position provides information from a single viewing perspective, and a single orientation relative to the illumination. The use of only a single perspective often leads to incorrect decisions. It has long been observed, for example, that a change in perspective of as little as a single pixel can in some cases change an incorrect decision to a correct one. By contrast, a human inspecting an object usually moves it around relative to his eyes and the lights to make a more reliable decision.

Machine vision systems have additional limitations arising from their use of a trigger signal. The need for a trigger signal makes the setup more complex—a photodetector must be mounted and adjusted, or software must be written for a PLC or computer to provide an appropriate message. When a photodetector is used, which is almost always the case when the objects are in continuous motion, a production line changeover may require it to be physically moved, which can offset some of the advantages of a vision system. Furthermore, photodetectors can only respond to a change in light intensity reflected from an object or transmitted along a path. In some cases, such a condition may not be sufficient to reliably detect when an object has entered the field of view.

Some prior art vision systems used with objects in continuous motion can operate without a trigger using a method often called self-triggering. These systems typically operate by monitoring one or more portions of captured images for a change in brightness or color that indicates the presence of an object. Self-triggering is rarely used in practice due to several limitations:

The vision systems respond too slowly for self-triggering to work at common production speeds;

The methods provided to detect when an object is present are not sufficient in many cases; and The vision systems do not provide useful output signals that are synchronized to a specific, repeatable position of the object along the production line, signals that are typically provided by the photodetector that acts as a trigger and needed by a PLC or handling mechanism to take action based on the vision system's decision.

Many of the limitations of machine vision systems arise in part because they operate too slowly to capture and analyze multiple perspectives of objects in motion, and too slowly to react to events happening in the field of view. Since most vision systems can capture a new image simultaneously with analysis of the current image, the maximum rate at which a vision system can operate is determined by the larger of the capture time and the analysis time. Overall, one of the most significant factors in determining this rate is the number of pixels comprising the imager.

The time needed to capture an image is determined primarily by the number of pixels in the imager, for two basic reasons. First, the shutter time is determined by the amount of light available and the sensitivity of each pixel. Since having more pixels generally means making them smaller and therefore less sensitive, it is generally the case that increasing the number of pixels increases the shutter time. Second, the conversion and storage time is proportional to the number of pixels. Thus the more pixels one has, the longer the capture time.

For at least the last 25 years, prior art vision systems generally have used about 300,000 pixels; more recently some systems have become available that use over 1,000,000, and over the years a small number of systems have used as few as 75,000. Just as with digital cameras, the recent trend is to more pixels for improved image resolution. Over the same period of time, during which computer speeds have improved a million-fold and imagers have changed from vacuum tubes to solid state, machine vision image capture times generally have improved from about $\frac{1}{30}$ second to about $\frac{1}{60}$ second, only a factor of two. Faster computers have allowed more sophisticated analysis, but the maximum rate at which a vision system can operate has hardly changed.

The Vision Detector Method and Apparatus teaches novel methods and systems that can overcome the above-described limitations of prior art machine vision systems. These teachings also provide fertile ground for innovation leading to improvements beyond the scope of the original teachings. In the following section the Vision Detector Method and Apparatus is briefly summarized, and a subsequent section lays out the problems to be addressed by the present invention.

Vision Detector Method and Apparatus

The Vision Detector Method and Apparatus provides systems and methods for automatic optoelectronic detection and inspection of objects, based on capturing digital images of a two-dimensional field of view in which an object to be detected or inspected may be located, and then analyzing the images and making decisions. These systems and methods analyze patterns of brightness reflected from extended areas, handle many distinct features on the object, accommodate line changeovers through software means, and handle uncertain and variable object locations. They are less expensive and easier to set up than prior art machine vision systems, and operate at much higher speeds. These systems and methods furthermore make use of multiple perspectives of moving objects, operate without triggers, provide appropriately synchronized output signals, and provide other significant and useful capabilities that will be apparent to those skilled in the art.

One aspect of the Vision Detector Method and Apparatus is an apparatus, called a vision detector, that can capture and analyze a sequence of images at higher speeds than prior art vision systems. An image in such a sequence that is captured and analyzed is called a frame. The rate at which frames are captured and analyzed, called the frame rate, is sufficiently high that a moving object is seen in multiple consecutive frames as it passes through the field of view (FOV). Since the objects moves somewhat between successive frames, it is located in multiple positions in the FOV, and therefore it is seen from multiple viewing perspectives and positions relative to the illumination.

Another aspect of the Vision Detector Method and Apparatus is a method, called dynamic image analysis, for inspecting objects by capturing and analyzing multiple frames for which the object is located in the field of view, and basing a result on a combination of evidence obtained from each of those frames. The method provides significant advantages over prior art machine vision systems that make decisions based on a single frame.

Yet another aspect of the Vision Detector Method and Apparatus is a method, called visual event detection, for detecting events that may occur in the field of view. An event can be an object passing through the field of view, and by using visual event detection the object can be detected without the need for a trigger signal.

Additional aspects of the Vision Detector Method and Apparatus will be apparent by a study of the figures and detailed descriptions given therein.

In order to obtain images from multiple perspectives, it is desirable that an object to be detected or inspected moves no more than a small fraction of the field of view between successive frames, often no more than a few pixels. According to the Vision Detector Method and Apparatus, it is generally desirable that the object motion be no more than about one-quarter of the FOV per frame, and in typical embodiments no more than 5% or less of the FOV. It is desirable that this be achieved not by slowing down a manufacturing process but by providing a sufficiently high frame rate. In an example system the frame rate is at least 200 frames/second, and in another example the frame rate is at least 40 times the average rate at which objects are presented to the vision detector.

An exemplary system is taught that can capture and analyze up to 500 frames/second. This system makes use of an ultra-sensitive imager that has far fewer pixels than prior art vision systems. The high sensitivity allows very short shutter times using very inexpensive LED illumination, which in combination with the relatively small number of pixels allows very short image capture times. The imager is interfaced to a digital signal processor (DSP) that can receive and store pixel data simultaneously with analysis operations. Using methods taught therein and implemented by means of suitable software for the DSP, the time to analyze each frame generally can be kept to within the time needed to capture the next frame. The capture and analysis methods and apparatus combine to provide the desired high frame rate. By carefully matching the capabilities of the imager, DSP, and illumination with the objectives of the invention, the exemplary system can be significantly less expensive than prior art machine vision systems.

The method of visual event detection involves capturing a sequence of frames and analyzing each frame to determine evidence that an event is occurring or has occurred. When visual event detection used to detect objects without the need for a trigger signal, the analysis would determine evidence that an object is located in the field of view.

In an exemplary method the evidence is in the form of a value, called an object detection weight, that indicates a level of confidence that an object is located in the field of view. The value may be a simple yes/no choice that indicates high or low confidence, a number that indicates a range of levels of confidence, or any item of information that conveys evidence. One example of such a number is a so-called fuzzy logic value, further described below and in Vision Detector Method and Apparatus. Note that no machine can make a perfect decision from an image, and so it will instead make judgments based on imperfect evidence.

When performing object detection, a test is made for each frame to decide whether the evidence is sufficient that an object is located in the field of view. If a simple yes/no value is used, the evidence may be considered sufficient if the value is "yes". If a number is used, sufficiency may be determined by comparing the number to a threshold. Frames where the evidence is sufficient are called active frames. Note that what constitutes sufficient evidence is ultimately defined by a human user who configures the vision detector based on an understanding of the specific application at hand. The vision detector automatically applies that definition in making its decisions.

When performing object detection, each object passing through the field of view will produce multiple active frames due to the high frame rate of the vision detector. These frames may not be strictly consecutive, however, because as the object passes through the field of view there may be some viewing perspectives, or other conditions, for which the evidence that the object is located in the field of view is not sufficient. Therefore it is desirable that detection of an object begins when a active frame is found, but does not end until a number of consecutive inactive frames are found. This number can be chosen as appropriate by a user.

Once a set of active frames has been found that may correspond to an object passing through the field of view, it is desirable to perform a further analysis to determine whether an object has indeed been detected. This further analysis may consider some statistics of the active frames, including the number of active frames, the sum of the object detection weights, the average object detection weight, and the like.

The method of dynamic image analysis involves capturing and analyzing multiple frames to inspect an object, where "inspect" means to determine some information about the status of the object. In one example of this method, the status of an object includes whether or not the object satisfies inspection criteria chosen as appropriate by a user.

In some aspects of the Vision Detector Method and Apparatus dynamic image analysis is combined with visual event detection, so that the active frames chosen by the visual event detection method are the ones used by the dynamic image analysis method to inspect the object. In other aspects of the Vision Detector Method and Apparatus, the frames to be used by dynamic image analysis can be captured in response to a trigger signal.

Each such frame is analyzed to determine evidence that the object satisfies the inspection criteria. In one exemplary method, the evidence is in the form of a value, called an object pass score, that indicates a level of confidence that the object satisfies the inspection criteria. As with object detection weights, the value may be a simple yes/no choice that indicates high or low confidence, a number, such as a fuzzy logic value, that indicates a range of levels of confidence, or any item of information that conveys evidence.

The status of the object may be determined from statistics of the object pass scores, such as an average or percentile of the object pass scores. The status may also be determined by weighted statistics, such as a weighted average or weighted percentile, using the object detection weights. Weighted statistics effectively weight evidence more heavily from frames wherein the confidence is higher that the object is actually located in the field of view for that frame.

Evidence for object detection and inspection is obtained by examining a frame for information about one or more visible features of the object. A visible feature is a portion of the object wherein the amount, pattern, or other characteristic of emitted light conveys information about the presence, identity, or status of the object. Light can be emitted by any process or combination of processes, including but not limited to reflection, transmission, or refraction of a source external or internal to the object, or directly from a source internal to the object.

One aspect of the Vision Detector Method and Apparatus is a method for obtaining evidence, including object detection weights and object pass scores, by image analysis operations on one or more regions of interest in each frame for which the evidence is needed. In example of this method, the image analysis operation computes a measurement based on the pixel values in the region of interest, where the measurement is responsive to some appropriate characteristic of a visible feature of the object. The measurement is converted to a logic value by a threshold operation, and the logic values obtained from the regions of interest are combined to produce the evidence for the frame. The logic values can be binary or fuzzy logic values, with the thresholds and logical combination being binary or fuzzy as appropriate.

For visual event detection, evidence that an object is located in the field of view is effectively defined by the regions of interest, measurements, thresholds, logical combinations, and other parameters further described herein, which are collectively called the configuration of the vision detector and are chosen by a user as appropriate for a given application of the invention. Similarly, the configuration of the vision detector defines what constitutes sufficient evidence.

For dynamic image analysis, evidence that an object satisfies the inspection criteria is also effectively defined by the configuration of the vision detector.

Discussion of the Problem

The Vision Detector Method and Apparatus teaches various operating parameters that are set by a user depending on conditions of the application. These parameters include:

the shutter time and video gain of the imager;

frame count parameters used to control the number of frames to be analyzed for visual event detection and dynamic image analysis;

idle time parameters use to avoid misdetection of objects and for other purposes; and search range parameters used to help track objects as they move through the field of view.

The Vision Detector Method and Apparatus provides explanations of these parameters, as well as useful default values for illustrative embodiments, that in conjunction with general knowledge in the art guide a person of ordinary skill in setting them as appropriate for the conditions of his application. Note that doing so is at least in part a matter of human judgment—there is no formula or set of formulas that gives optimal results in all situations, partly because most situations cannot be foreseen and partly because setting the parameters involves engineering tradeoffs where there is no clear optimal solution.

It has long been observed that the people who install and configure optoelectronic inspection devices in factories are often of considerably less than ordinary skill in the art of the Vision Detector Method and Apparatus. These people are generally skilled manufacturing engineers or technicians, but may have no training in the field of the invention that would allow them to analyze the manufacturing conditions and set the parameters. These people will know production conditions related to their own expertise, such as the physical speed of the line, the physical size of the field of view (i.e. inches, not pixels), and the production rate, but may not know how to relate those conditions to suitable values for the operating parameters of a vision detector.

Thus there is a need to provide methods and systems that can choose reasonable values for vision detector operating parameters using production line information that is likely to be known to manufacturing engineers and technicians.

SUMMARY OF THE INVENTION

In one aspect the invention provides methods and systems to set a shutter time parameter and a gain parameter of an imager that is configured to capture images of a field of view of a production line. The production line moves relative to the field of view at a nominal line speed, and the size of the field of view in the direction of motion is known. The line speed and size information can be provided by a manufacturing technician.

The shutter time parameter provides a tradeoff between two desirable effects: shorter times result in less blurring of captured images due to motion, and longer times result in a better signal-to-noise ratio and, except for possible motion blurring, higher image fidelity.

Video gain affects signal and noise equally, so in principal there is no tradeoff to be made. In practice, high gain values can introduce signal distortion, and should be avoided. For any imager, there will be a minimum and a maximum allowable value that can be used for video gain.

The product of shutter time and video gain is in units of time (since gain is dimensionless), and will be called brightness shutter time herein, since this product determines the overall brightness of the captured image. Brightness shutter time should be chosen so that the various shades of gray that make up visible features in the field of view can reliably be distinguished. If the brightness is too low, shades will be compressed at the low end of the gray scale range, and a range of the darkest shades will be assigned the minimum gray value, a condition called cutoff, and therefore be lost. Likewise if the brightness is too high, shades will be compressed at the high end of the gray scale range, and a range of the brightest shades will be assigned the maximum gray value, a condition called saturation, and therefore be lost. Thus brightness shutter time should be chosen to spread the shades of gray over most of the gray scale range, but without running into the minimum or maximum gray values.

Suitable values for brightness shutter time can be chosen by a human observer looking at captured images. With a well-designed human-machine interface, this can be carried out by manufacturing technicians who may not be skilled in the art, because human visual intuition is excellent even when the underlying theory is not understood. Alternatively, suitable values for brightness shutter time can be chosen by automated image analysis using techniques well-known in the art, using for example a histogram of gray values in the captured image.

It is convenient for the technician or automated image analysis to work with a brightness parameter, from which the corresponding brightness shutter time is computed. In the simplest case the brightness parameter is the brightness shutter time, and the computation just copies the parameter. In an illustrative embodiment, the brightness parameter is in the range 0-1, and is the logarithm of the brightness shutter time over the range from its minimum to its maximum value.

Clearly there is a range of choices for shutter time and video gain that will produce a particular brightness shutter time, and a good choice depends on making a reasonable tradeoff between blurring and fidelity. The invention provides methods and systems for setting the shutter time and video gain parameters so that the desired brightness is achieved and a reasonable tradeoff is made given production line conditions provided by a technician.

According to the invention, a motion parameter is chosen that specifies the desired motion of the production line during a shutter time interval so as to avoid excessive image blurring. In an illustrative embodiment, the choice is built into the vision detector as an internal parameter, so that a technician does not have to choose it. The motion parameter is specified in pixels, or units related to pixels such as a fraction of the field of view, because pixels specify the spatial resolution of the imager. In an illustrative embodiment, the motion parameter is one-third of a pixel.

Using the nominal line speed, provided in an illustrative embodiment by a technician, the apparent line speed is estimated. The apparent line speed is the speed as it appears to the imager, in units related to pixels per unit of time, as distinguished from the nominal line speed in physical units such as inches per second. Using the apparent line speed estimate and the motion parameter, a motion shutter time is computed, which specifies the longest shutter time that avoids excessive blurring. Note that shorter or longer times can be used based on the tradeoff between blurring and fidelity. Note further that the actual line speed at any given time may differ from the nominal line speed, which may result is some degradation in performance if the difference is substantial.

Once the motion shutter time and brightness shutter time are known, the desired shutter time and video gain for the imager can be computed. As described above, the product of the desired shutter time and video gain must equal, at least approximately, the brightness shutter time, and the video gain must be between the minimum and maximum allowable values. The invention recognizes three conditions, any of which would result in good choices for the parameters:

The desired shutter time is approximately equal to the motion shutter time. This means that a value for the desired video gain can be found within its allowable range that provides the highest fidelity while avoiding excessive blurring;

The desired shutter time is less than the motion shutter time and the desired gain is approximately equal to the minimum allowable gain value. This means that there is so much light that the shutter time has to be shorter to achieve suitable brightness; and The desired shutter time is greater than the motion shutter time and the desired gain is approximately equal to the maximum allowable gain value. This means that there is so little light that longer shutter times are needed, and the increased blurring will have to be tolerated.

Once the desired shutter time and video gain are computed, the corresponding imager parameters are set to those values.

A variety of methods can be used to estimate the apparent line speed from the nominal line speed. In some embodiments, the vision detector has a fixed, predetermined field of view size, and so apparent speed can be estimated from just the nominal line speed. In other embodiments, a technician can estimate production lines values that convey suitable information about physical attributes of the production line, and also estimate the size of the field of view in the direction of motion, from which the apparent line speed can be computed.

In an illustrative embodiment, the production line value is line speed in units of distance per unit of time, for example inches per second. In another illustrative embodiment, where the production line contains a sequence of discrete objects, the production line values include an estimate of the nominal object frequency in objects per unit of time, and the nominal object spacing in units of distance.

In another aspect the invention provides methods and systems to set an idle time parameter of a vision detector. As further described below, idle time is an interval of time immediately after an object is detected during which frames are not captured and analyzed, and therefore during which a new object will not be detected. The idle time helps prevent detecting one object more than once, and also can extend the life of the illumination because it can be kept off during that period.

Idle time is used when a vision detector is configured to detect a sequence of discrete objects in continuous motion, and where analysis of captured images, as in the method of visual event detection, is used to detect the objects. If instead an external trigger signal is used, avoiding multiple detection and misdetection is the responsibility of that signal.

In one illustrative embodiment, information about the nominal speed of the objects is provided, for example by a manufacturing technician. A motion parameter is chosen that specifies the desired motion of an object during an idle time interval. The choice can be built into the vision detector as an internal parameter, so that the technician does not have to choose it. The motion parameter is specified in pixels, or units related to pixels such as a fraction of the field of view.

Using the nominal object speed, the apparent object speed is estimated. Apparent and nominal object speed are equivalent to apparent and nominal line speed as discussed above— as the present invention uses these values, it does not matter whether what is moving through the field of view is described as a production line, an object, or any other entity. Using the apparent object speed estimate and the motion parameter, the desired idle time is computed and the idle time parameter is set. In this illustrative embodiment, the desired idle time is simply the ratio of the motion parameter to the apparent object speed. Note that the actual object speed at any given time may differ from the nominal object speed, which may increase the risk of multiple detection or misdetection.

In another illustrative embodiment, information about the nominal period between objects presented to the vision detector is provided, for example by a manufacturing technician. This information may be in the form of the period itself, the equivalent object frequency (presentation rate), the combination of nominal object speed and nominal object spacing, or any other suitable method. A motion parameter is chosen that specifies the desired motion of an object during an idle time interval, as a fraction of the nominal object period. The choice can be built into the vision detector as an internal parameter, so that the technician does not have to choose it. Using the nominal object period and the motion parameter, the desired idle time is computed and the idle time parameter is set.

In some embodiments of the Vision Detector Method and Apparatus, as further described below, two idle time parameters are used: a minimum idle time and a maximum idle time. When using those embodiments, the present invention teaches that both may be set as described above, using one motion parameter for the minimum idle time and a second motion parameter for the maximum idle time.

Setting an idle time parameter is a tradeoff between the risk of detecting one object more than once, and the risk of missing an object that arrives subsequent to an object that is detected. A vision detector will have a portion of the field of view, called the detection range, within which objects can be detected. An idle time parameter should be set large enough that an object that has just been detected, and is therefore still in the detection range, will move beyond the detection range during the idle time so that it cannot be detected again. It should further be set small enough that an object subsequent to an object just detected, and therefore not yet in the detection range, does not enter the detection range during the idle time so that it cannot be missed. Note that it may not be possible to find settings that guarantee those outcomes in all cases, due to ordinary variation in manufacturing conditions.

In another aspect the invention provides methods and systems to set a frame count parameter of a vision detector. As further described below, a frame count parameter controls the number of frames to be analyzed for visual event detection and dynamic image analysis. The vision detector is configured to inspect a sequence of discrete objects in continuous motion at a nominal object speed relative to its field of view. The configuration results in the vision detector operating at a nominal frame rate, and having a detection range that includes a length in the direction of motion of the objects.

Each object is inspected following the teachings of dynamic image analysis as described below and in The Vision Detector Method and Apparatus. According to those teachings, the inspection includes for each object an analysis of multiple frames captured by the vision detector.

Using the nominal object speed, which can be provided by a manufacturing technician, and the nominal frame rate, which is known or can be measured based on the configuration, a motion value is estimated that specifies the nominal distance that an object is expected to move between successive frames. From the nominal distance and the length in the direction of motion of the detection range, an expected frame count value is computed, which indicates the nominal number of frames for which an object can be located. The desired frame count is computed from the expected frame count value, and the vision detector's frame count parameter is set accordingly.

Note that the actual count of frames for which a particular object is located may differ from the expected frame count value due to normal variations in manufacturing conditions. In computing the desired frame count from the expected frame count, this variation can be considered. In an illustrative embodiment, the desired frame count is a predetermined fraction of the expected frame count.

In an illustrative embodiment, the vision detector is further configured to detect objects following the teachings of visual event detection as described below and in The Vision Detector Method and Apparatus. According to those teachings, the detection includes for each object an further analysis of multiple frames captured by the vision detector. In this embodiment, two frame count parameters are set according to the method just described. The first parameter specifies the minimum number of frames that must be found to contain sufficient evidence that an object is present in the field of view, following the teachings of visual event detection, in order for the object to be detected The second parameter specifies the maximum number of frames that will be analyzed to inspect each object, following the teachings of dynamic image analysis.

In another illustrative embodiment, the vision detector is further configured to detect objects using a trigger signal. A frame count parameter specifies the number of frames that will be analyzed to inspect each object, following the teachings of dynamic image analysis.

In another aspect the invention provides methods and systems to set a search range parameter of a Locator. The vision detector is configured to inspect a sequence of discrete objects in continuous motion at a nominal object speed relative to its field of view. The configuration results in the vision detector operating at a nominal frame rate, and includes a Locator that locates objects within the search range, which is oriented in the direction of motion of the objects.

Each object is inspected following the teachings of dynamic image analysis as described below and in The Vision Detector Method and Apparatus. According to those teachings, the inspection includes for each object an analysis of multiple frames captured by the vision detector.

A target frame count parameter is chosen that specifies, for each object, a count of frames that it is desirable to analyze to inspect the object following the teachings of dynamic image analysis. Using the nominal object speed, which can be provided by a manufacturing technician, and the nominal frame rate, which is known or can be measured based on the configuration, a motion value is estimated that specifies the nominal distance that an object is expected to move between successive frames. From the motion value and the target frame count, the desired search range is computed and the search range parameter is set accordingly.

BRIEF DESCRIPTION OF THE DRAWINGS

The invention will be more fully understood from the following detailed description, in conjunction with the accompanying figures, wherein.

DETAILED DESCRIPTION OF THE INVENTION

Basic Operation of The Vision Detector Method and Apparatus

Figure 1:
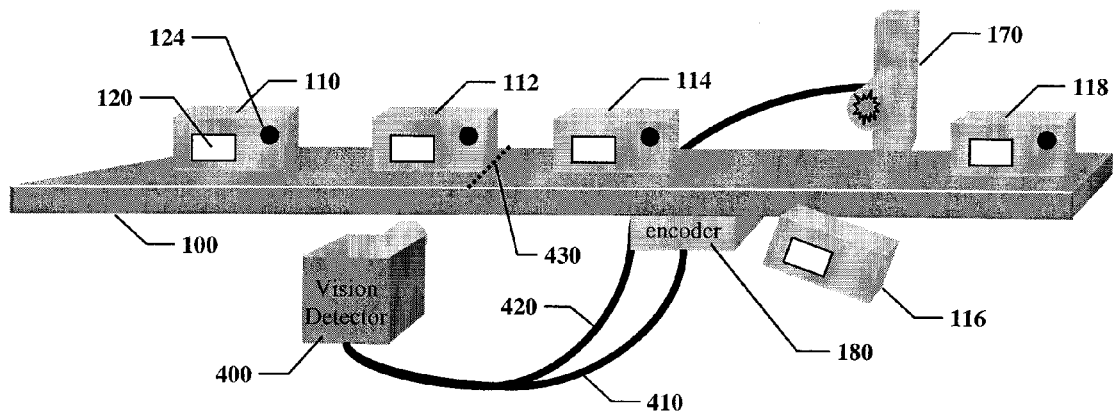
FIG. 1 shows an illustrative embodiment of a vision detector according to the Vision Detector Method and Apparatus, inspecting objects on a production line.

FIG. 1 shows an illustrative embodiment of a vision detector according to the Vision Detector Method and Apparatus, inspecting objects on a production line. A conveyer 100 transports objects to cause relative movement between the objects and the field of view of vision detector 400. Objects 110, 112, 114, 116, and 118 move left to right on a conveyer 100. Each object is expected to contain certain features, for example a label 120 and a hole 124. Objects incorrectly manufactured may be missing one or more features, or may have unintended features; for example, object 116 is missing the hole. On many production lines motion of the conveyer is tracked by a shaft encoder 180. A vision detector 400 detects the presence of an object by visual appearance and inspects it based on appropriate inspection criteria. If an object is defective, the vision detector sends signal 420 to reject actuator 170 to remove the object from the conveyer stream. The encoder 180 sends signal 410 to the vision detector, which uses it to insure proper delay of signal 420 from the encoder count where the object crosses some fixed, imaginary reference point 430, called the mark point. If an encoder is not used, the delay can be based on time instead.

In an alternate embodiment, the vision detector sends signals to a PLC for various purposes, which may include controlling a reject actuator.

In another embodiment, suitable in extremely high speed applications or where the vision detector cannot reliably detect the presence of an object, a photodetector is used to detect the presence of an object and sends a signal to the vision detector for that purpose.

In yet another embodiment there are no discrete objects, but rather material flows past the vision detector continuously, for example a web. In this case the material is inspected continuously, and signals are send by the vision detector to automation equipment, such as a PLC, as appropriate.

When a vision detector detects the presence of discrete objects by visual appearance, it is said to be operating in visual event detection mode. When a vision detector detects the presence of discrete objects using an external signal such as from a photodetector, it is said to be operating in external trigger mode. When a vision detector continuously inspects material, it is said to be operating in continuous analysis mode.

Figure 2:
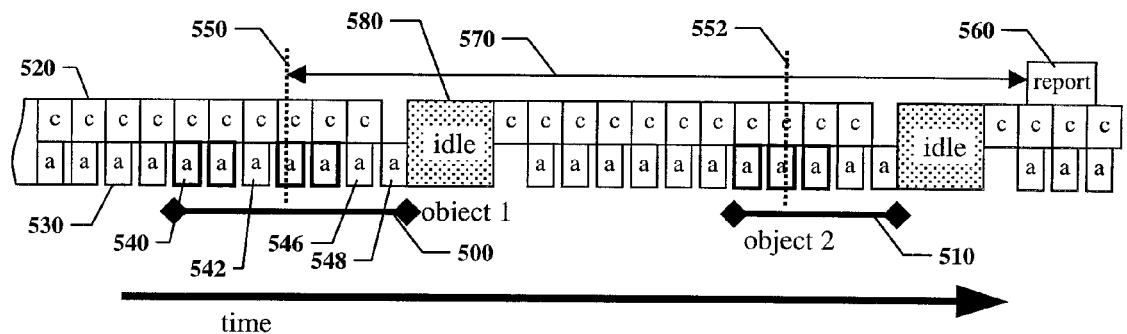
FIG. 2 shows a timeline that illustrates a typical operating cycle for a vision detector using visual event detection.

FIG. 2 shows a timeline that illustrates a typical operating cycle for a vision detector in visual event detection mode. Boxes labeled "c", such as box 520, represent image capture. Boxes labeled "a", such as box 530, represent image analysis. It is desirable that capture "c" of the next image be overlapped with analysis "a" of the current image, so that (for example) analysis step 530 analyzes the image captured in capture step 520. In this timeline, analysis is shown as taking less time than capture, but in general analysis will be shorter or longer than capture depending on the application details.

If capture and analysis are overlapped, the rate at which a vision detector can capture and analyze images is determined by the longer of the capture time and the analysis time. This is the "frame rate".

The Vision Detector Method and Apparatus allows objects to be detected reliably without a trigger signal, such as that provided by a photodetector. Referring to FIG. 1, there is no trigger signal to indicate the presence of an object, and in FIG. 2 there is no corresponding trigger step.

Referring again to FIG. 2, a portion 500 of the timeline corresponds to the inspection of a first object, and contains the capture and analysis of seven frames. A second portion 510 corresponds to the inspection of a second object, and contains five frames.

Each analysis step first considers the evidence that an object is present. Frames where the evidence is sufficient are called active. Analysis steps for active frames are shown with a thick border, for example analysis step 540. In an illustrative embodiment, inspection of an object begins when an active frame is found, and ends when some number of consecutive inactive frames are found. In the example of FIG. 2, inspection of the first object begins with the first active frame corresponding to analysis step 540, and ends with two consecutive inactive frames, corresponding to analysis steps 546 and 548. Note that for the first object, a single inactive frame corresponding to analysis step 542 is not sufficient to terminate the inspection.

At the time that inspection of an object is complete, for example at the end of analysis step 548, decisions are made on the status of the object based on the evidence obtained from the active frames. In an illustrative embodiment, if an insufficient number of active frames were found then there is considered to be insufficient evidence that an object was actually present, and so operation continues as if no active frames were found. Otherwise an object is judged to have been detected, and evidence from the active frames is judged in order to determine its status, for example pass or fail. A variety of methods may be used to detect objects and determine status within the scope of the Vision Detector Method and Apparatus; some are described below and many others will occur to those skilled in the art.

Once an object has been detected and a judgment made, a report may be made to appropriate automation equipment, such as a PLC, using signals well-known in the art. In such a case a report step would appear in the timeline. The example of FIG. 2 corresponds instead to a setup such as shown in FIG. 1, where the vision detector is used to control a downstream reject actuator 170 via signal 420. By considering the position of the object in the active frames as it passes through the field of view, the vision detector estimates the mark time 550 and 552 at which the object crosses the mark point 430. Note that in cases where an encoder 180 is used, the mark time is actually an encoder count; the reader will understand that time and count can be used interchangeably. A report 560, consisting of a pulse of appropriate duration to the reject actuator 170, is issued after a precise delay 570 in time or encoder count from the mark time 550.

Note that the report 560 may be delayed well beyond the inspection of subsequent objects such as 510. The vision detector uses well-known first-in first-out (FIFO) buffer methods to hold the reports until the appropriate time.

Once inspection of an object is complete, the vision detector may enter an idle step 580. Such a step is optional, but may be desirable for several reasons. If the maximum object rate is known, there is no need to be looking for an object until just before a new one is due. An idle step will eliminate the chance of false object detection at times when an object couldn't arrive, and will extend the lifetime of the illumination system because the lights can be kept off during the idle step.

Figure 3:
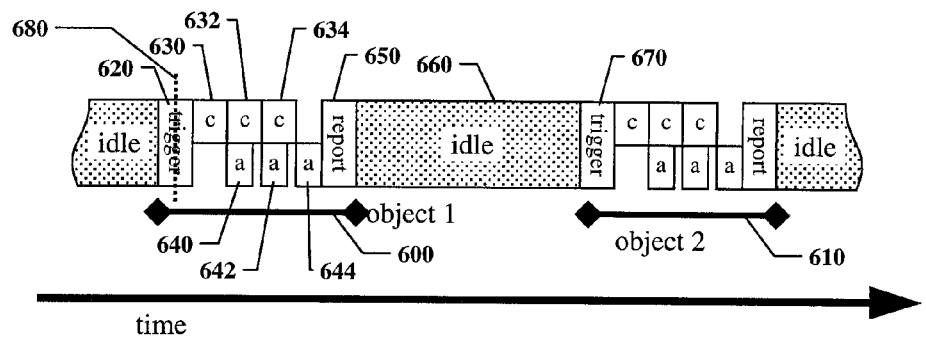
FIG. 3 shows a timeline that illustrates a typical operating cycle for a vision detector using a trigger signal.

FIG. 3 shows a timeline that illustrates a typical operating cycle for a vision detector in external trigger mode. A trigger step 620 begins inspection of a first object 600. A sequence of image capture steps 630, 632, and 634, and corresponding analysis steps 640, 642, and 644 are used for dynamic image analysis. As in visual event detection mode, it is desirable that the frame rate be sufficiently high that the object moves a small fraction of the field of view between successive frames, often no more than a few pixels per frame. After a fixed number of frames, the number being chosen based on application details, the evidence obtained from analysis of the frames is used to make a final judgment on the status of the object, which in one embodiment is provided to automation equipment in a report step 650. Following the report step, an idle step 660 is entered until the next trigger step 670 that begins inspection of a second object 610.

In another embodiment, the report step is delayed in a manner equivalent to that shown in FIG. 2. In this embodiment, the mark time 680 is the time (or encoder count) corresponding to the trigger step 620.

Illustrative Apparatus

Figure 4:
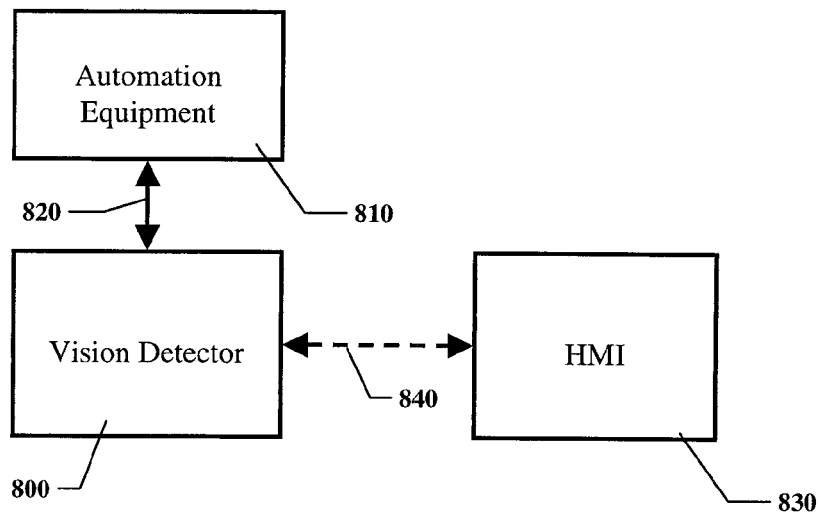
FIG. 4 shows a high-level block diagram for a vision detector in a production environment.

FIG. 4 shows a high-level block diagram for a vision detector in a production environment. A vision detector 800 is connected to appropriate automation equipment 810, which may include PLCs, reject actuators, and/or photodetectors, by means of signals 820. The vision detector may also be connected to a human-machine interface (HMI) 830, such as a PC or hand-held device, by means of signals 840. The HMI is used for setup and monitoring, and may be removed during normal production use. The signals can be implemented in any acceptable format and/or protocol and transmitted in a wired or wireless form.

Figure 5:
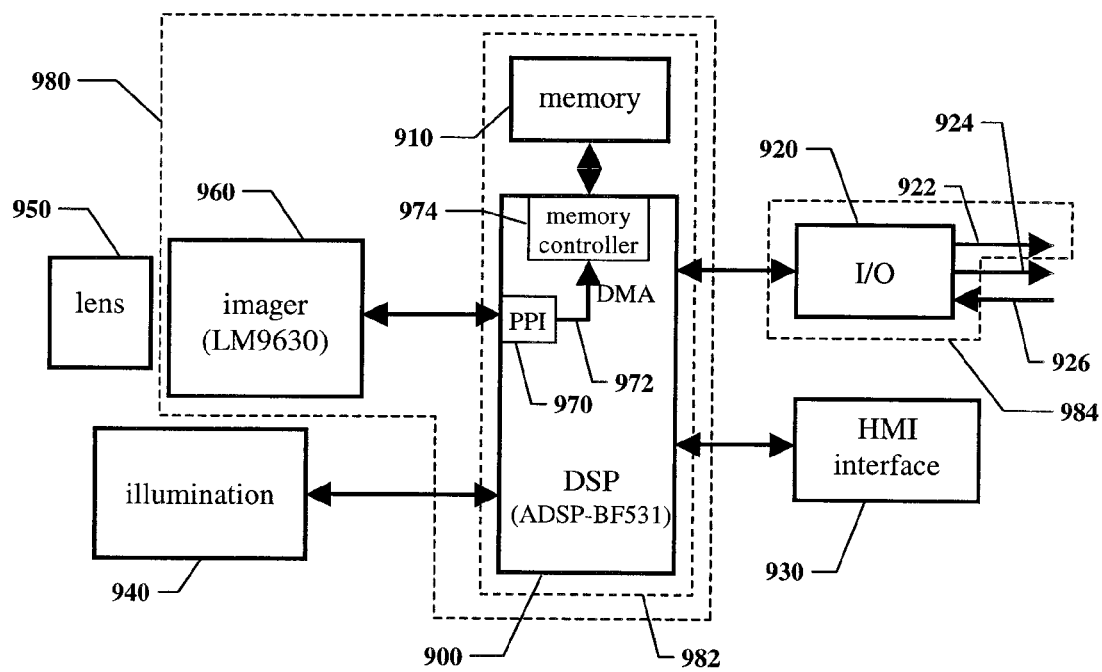
FIG. 5 shows a block diagram of an illustrative embodiment of a vision detector.

FIG. 5 shows a block diagram of an illustrative embodiment of a vision detector. A digital signal processor (DSP) 900 runs software to control capture, analysis, reporting, HMI communications, and any other appropriate functions needed by the vision detector. The DSP 900 is interfaced to a memory 910, which includes high speed random access memory for programs and data and non-volatile memory to hold programs and setup information when power is removed. The DSP is also connected to an I/O module 920 that provides signals to automation equipment, an HMI interface 930, an illumination module 940, and an imager 960. A lens 950 focuses images onto the photosensitive elements of the imager 960.

The DSP 900 can be any device capable of digital computation, information storage, and interface to other digital elements, including but not limited to a general-purpose computer, a PLC, or a microprocessor. It is desirable that the DSP 900 be inexpensive but fast enough to handle a high frame rate. It is further desirable that it be capable of receiving and storing pixel data from the imager simultaneously with image analysis.

In the illustrative embodiment of FIG. 5, the DSP 900 is an ADSP-BF531 manufactured by Analog Devices of Norwood, Mass. The Parallel Peripheral Interface (PPI) 970 of the ADSP-BF531 DSP 900 receives pixel data from the imager 960, and sends the data to memory controller 974 via Direct Memory Access (DMA) channel 972 for storage in memory 910. The use of the PPI 970 and DMA 972 allows, under appropriate software control, image capture to occur simultaneously with any other analysis performed by the DSP 900. Software instructions to control the PPI 970 and DMA 972 can be implemented by one of ordinary skill in the art following the programming instructions contained in the ADSP-BF533 Blackfin Processor Hardware Reference (part number 82-002005-01), and the Blackfin Processor Instruction Set Reference (part number 82-000410-14), both incorporated herein by reference. Note that the ADSP-BF531, and the compatible ADSP-BF532 and ADSP-BF533 devices, have identical programming instructions and can be used interchangeably in this illustrative embodiment to obtain an appropriate price/performance tradeoff.

The high frame rate desired by a vision detector suggests the use of an imager unlike those that have been used in prior art vision systems. It is desirable that the imager be unusually light sensitive, so that it can operate with extremely short shutter times using inexpensive illumination. It is further desirable that it be able to digitize and transmit pixel data to the DSP far faster than prior art vision systems. It is moreover desirable that it be inexpensive and have a global shutter.

These objectives may be met by choosing an imager with much higher light sensitivity and lower resolution than those used by prior art vision systems. In the illustrative embodiment of FIG. 5, the imager 960 is an LM9630 manufactured by National Semiconductor of Santa Clara, Calif. The LM9630 has an array of 128 by 100 pixels, for a total of 12800, about 24 times fewer than typical prior art vision systems. The pixels are relatively large at 20 microns square, providing high light sensitivity. The LM9630 can provide 500 frames per second when set for a 300 microsecond shutter time, and is sensitive enough (in most cases) to allow a 300 microsecond shutter using LED illumination. This resolution would be considered far too low for a vision system, but is quite sufficient for the feature detection tasks that are the objectives of the Vision Detector Method and Apparatus. Electrical interface and software control of the LM9630 can be implemented by one of ordinary skill in the art following the instructions contained in the LM9630 Data Sheet, Rev 1.0, January 2004, which is incorporated herein by reference.

It is desirable that the illumination 940 be inexpensive and yet bright enough to allow short shutter times. In an illustrative embodiment, a bank of high-intensity red LEDs operating at 630 nanometers is used, for example the HLMP-ED25 manufactured by Agilent Technologies. In another embodiment, high-intensity white LEDs are used to implement desired illumination.

In the illustrative embodiment of FIG. 5, the I/O module 920 provides output signals 922 and 924, and input signal 926. One such output signal can be used to provide signal 420 (FIG. 1) for control of reject actuator 170. Input signal 926 can be used to provide an external trigger.

As used herein an image capture device provides means to capture and store a digital image. In the illustrative embodiment of FIG. 5, image capture device 980 comprises a DSP 900, imager 960, memory 910, and associated electrical interfaces and software instructions.

As used herein an analyzer provides means for analysis of digital data, including but not limited to a digital image. In the illustrative embodiment of FIG. 5, analyzer 982 comprises a DSP 900, a memory 910, and associated electrical interfaces and software instructions.

As used herein an output signaler provides means to produce an output signal responsive to an analysis. In the illustrative embodiment of FIG. 5, output signaler 984 comprises an I/O module 920 and an output signal 922.

It will be understood by one of ordinary skill that there are many alternate arrangements, devices, and software instructions that could be used within the scope of the Vision Detector Method and Apparatus to implement an image capture device 980, analyzer 982, and output signaler 984.

A variety of engineering tradeoffs can be made to provide efficient operation of an apparatus according to the Vision Detector Method and Apparatus for a specific application. Consider the following definitions:

b fraction of the FOV occupied by the portion of the object that contains the visible features to be inspected, determined by choosing the optical magnification of the lens 950 so as to achieve good use of the available resolution of imager 960;

e fraction of the FOV to be used as a margin of error;

n desired minimum number of frames in which each object will typically be seen;

s spacing between objects as a multiple of the FOV, generally determined by manufacturing conditions;

p object presentation rate, generally determined by manufacturing conditions;

m maximum fraction of the FOV that the object will move between successive frames, chosen based on above values; and r minimum frame rate, chosen based on above values.

From these definitions it can be seen that $$m \leq \frac{1-b-e}{n} \quad (1)$$

and $$r \geq \frac{sp}{m} \quad (2)$$

To achieve good use of the available resolution of the imager, it is desirable that b is at least 50%. For dynamic image analysis, n should be at least 2. Therefore it is further desirable that the object moves no more than about one-quarter of the field of view between successive frames.

In an illustrative embodiment, reasonable values might be b=75%, e=5%, and n=4. This implies that m≦5%, i.e. that one would choose a frame rate so that an object would move no more than about 5% of the FOV between frames. If manufacturing conditions were such that s=2, then the frame rate r would need to be at least approximately 40 times the object presentation rate p. To handle an object presentation rate of 5 Hz, which is fairly typical of industrial manufacturing, the desired frame rate would be at least around 200 Hz. This rate could be achieved using an LM9630 with at most a 3.3 millisecond shutter time, as long as the image analysis is arranged so as to fit within the 5 millisecond frame period. Using available technology, it would be feasible to achieve this rate using an imager containing up to about 40,000 pixels.

With the same illustrative embodiment and a higher object presentation rate of 12.5 Hz, the desired frame rate would be at least approximately 500 Hz. An LM9630 could handle this rate by using at most a 300 microsecond shutter.

In another illustrative embodiment, one might choose b=75%, e=15%, and n=5, so that m≦2%. With s=2 and p=5 Hz, the desired frame rate would again be at least approximately 500 Hz.

Fuzzy Logic Decision Making

Figure 6:
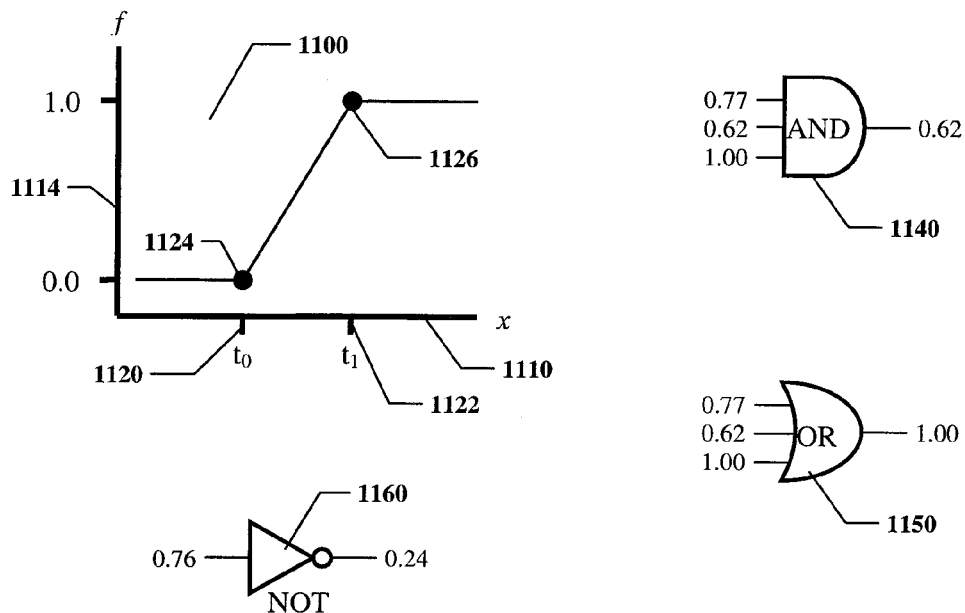
FIG. 6 shows fuzzy logic elements used in an illustrative embodiment to weigh evidence and make judgments, including judging whether an object is present and whether it passes inspection.

FIG. 6 shows fuzzy logic elements used in an illustrative embodiment to weigh evidence and make judgments, including judging whether an object is present and whether it passes inspection.

A fuzzy logic value is a number between 0 and 1 that represents an estimate of confidence that some specific condition is true. A value of 1 signifies high confidence that the condition is true, 0 signifies high confidence that the condition is false, and intermediate values signify intermediate levels of confidence.

The more familiar binary logic is a subset of fuzzy logic, where the confidence values are restricted to just 0 and 1. Therefore, any embodiment described herein that uses fuzzy logic values can use as an alternative binary logic values, with any fuzzy logic method or apparatus using those values replaced with an equivalent binary logic method or apparatus.

Just as binary logic values are obtained from raw measurements by using a threshold, fuzzy logic values are obtained using a fuzzy threshold. Referring to FIG. 6, a graph 1100 illustrates a fuzzy threshold. The x-axis 1110 represents a raw measurement, and the f-axis 1114 represents the fuzzy logic value, which is a function whose domain includes all possible raw measurements and whose range is $0 \leq f \leq 1$.

In an illustrative embodiment, a fuzzy threshold comprises two numbers shown on the x-axis, low threshold $t_0$ 1120, and high threshold $t_1$ 1122, corresponding to points on the function 1124 and 1126. The fuzzy threshold can be defined by the equation $$f = \min\left(\max\left(\frac{x-t_0}{t_1-t_0}, 0\right), 1\right) \quad (3)$$

Note that this function works just as well when $t_1 < t_0$. Other functions can also be used for a fuzzy threshold, such as the sigmoid $$f = \frac{1}{1 + e^{-(x-t)/\sigma}} \quad (4)$$

where t and σ are threshold parameters. In embodiments where simplicity is a goal, a conventional binary threshold can be used, resulting in binary logic values.

Fuzzy decision making is based on fuzzy versions of AND 1140, OR 1150, and NOT 1160. A fuzzy AND of two or more fuzzy logic values is the minimum value, and a fuzzy OR is the maximum value. Fuzzy NOT of f is 1−f. Fuzzy logic is identical to binary when the fuzzy logic values are restricted to 0 and 1.

In an illustrative embodiment, whenever a hard true/false decision is needed, a fuzzy logic value is considered true if it is at least 0.5, false if it is less than 0.5.

It will be clear to one skilled in the art that there is nothing critical about the values 0 and 1 as used in connection with fuzzy logic herein. Any number could be used to represent high confidence that a condition is true, and any different number could be used to represent high confidence that the condition is false, with intermediate values representing intermediate levels of confidence.

Dynamic Image Analysis

Figure 7:
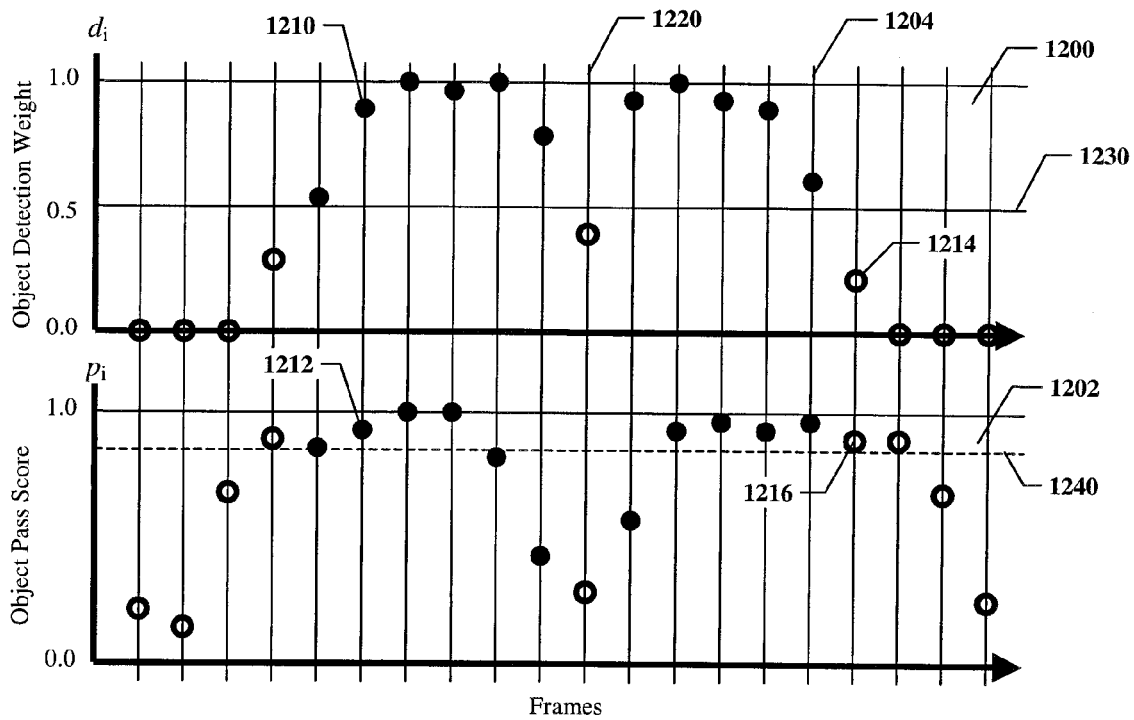
FIG. 7 illustrates how evidence is weighed for dynamic image analysis in an illustrative embodiment.

FIG. 7 illustrates how evidence is weighed for dynamic image analysis in an illustrative embodiment. In this embodiment two decisions, called the primary decisions, must be made:

1. Is an object, or a set of visible features of an object, located in the field of view?
2. If so, what is the status of the object?

Information comprising evidence that an object is located in the field of view is called an object detection weight. Information comprising evidence regarding the status of an object is called an object pass score. In various illustrative embodiments, the status of the object comprises whether or not the object satisfies inspection criteria chosen as appropriate by a user. In the following, an object that satisfies the inspection criteria is sometimes said to "pass inspection".

FIG. 7 shows two plots, object detection plot 1200 and object pass plot 1202. The horizontal axes of the two plots represent a frame sequence number i; each frame is represented by a vertical line, such as example line 1204.

In the illustrative embodiment of FIG. 7, object detection weights are fuzzy logic values $d_i$, representing evidence that an object is located in the FOV in frame i, and are computed by the vision detector on each frame using methods further described below and in the Vision Detector Method and Apparatus. Object pass scores are fuzzy logic values $p_i$, representing evidence that an object satisfies appropriate inspection criteria in frame i, and are computed by the vision detector on selected frames using methods further described below and in the Vision Detector Method and Apparatus. The vertical axis of object detection plot 1200 represents $d_i$, and the vertical axis of object pass plot 1202 represents $p_i$.

In the illustrative embodiment of FIG. 7, frames where $d_i \geq 0.5$ are considered active (refer to the above description of FIG. 2 for an explanation of active frames). For reference, a line 1230 where $d_i=0.5$ is plotted. Object detection weights and pass scores for active frames are plotted as solid circles, for example points 1210 and 1212, and those for inactive frames are plotted as open circles, for example points 1214 and 1216. In some embodiments, the object pass weights are only computed for active frames; while in the embodiment of FIG. 7, they are computed for all frames, whether or not deemed "active".

In the example of FIG. 7, all of the active frames correspond to the inspection of a single object; as explained in the above description of FIG. 2, the isolated inactive frame 1220 does not terminate the inspection.

In one embodiment, an object is judged to have been detected if the number of active frames found exceeds some threshold. An another embodiment, an object is judged to have been detected if the total object detection weight over all active frames exceeds some threshold. These thresholds are set as appropriate for a given application (see FIG. 14).

In the illustrative embodiment of FIG. 7, an object is judged to pass inspection if the weighted average of the object pass scores, each weighted by the corresponding object detection weight, is at least 0.5. More precisely, the object passes inspection if $$\frac{\sum_i d_i p_i}{\sum_i d_i} \geq 0.5 \qquad (5)$$

where the summation is over all active frames. The effect of this formula is to average the object pass scores, but to weight each score based on the confidence that the object really did appear in the corresponding frame.

In an alternate embodiment, an object is judged to pass inspection if the average of the object pass scores is at least 0.5. This is equivalent to a weighted average wherein all of the weights are equal.

In the example of FIG. 7, the weighted average pass score is around 0.86, which is plotted as line 1240. The number of active frames is 11, and the total object detection weight is around 9.5. In this example an object is detected and passes inspection.

Figure 8:
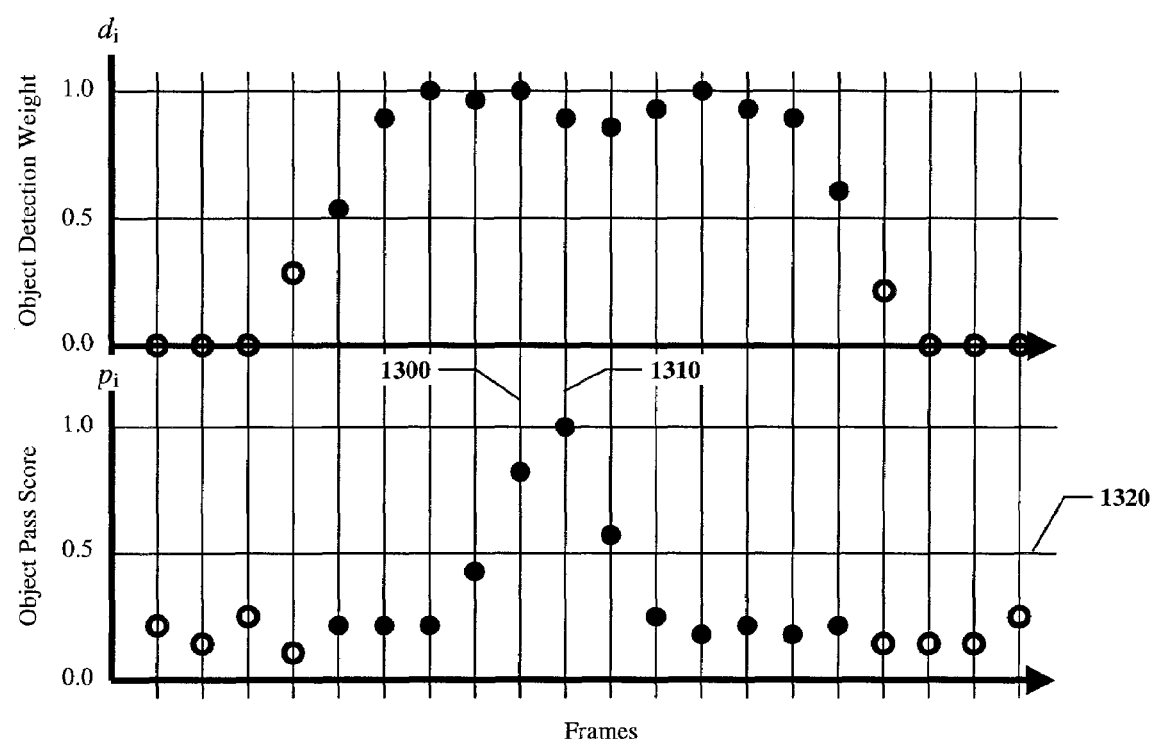
FIG. 8 illustrates how evidence is weighed for dynamic image analysis in another illustrative embodiment.

FIG. 8 illustrates how evidence is weighed for dynamic image analysis in another illustrative embodiment. In this example, object features being inspected are difficult to see and only appear with confidence in a small number of the active frames, primarily frames 1300 and 1310, when the viewing and illumination perspective is just right as the object moves through the field of view. As long as the evidence is sufficient in these few frames that the features are present, the object should pass inspection. In this scenario, there is no way to know in advance which of the active frames will contain this evidence. Thus, weighted average pass score is not appropriate in this case. An alternative is to pass the object if the pass score exceeds some threshold in any of the active frames, but this alternative may pass objects on the basis of too little evidence. In the illustrative embodiment of FIG. 8, a weighted percentile method is used.

The weighted percentile method is based on the fraction $Q(p)$ of total weight where the pass score is at least p:

$$Q(p) = \frac{\sum_{k | p_k \geq p}}{\sum_i d_i} \qquad (6)$$

The object is judged to pass if $Q(p)$ is at least some threshold t. In the illustrative embodiment of FIG. 8, p=0.5, which is plotted as line 1320. A reasonable threshold t for this case would be 10%.

Useful behavior is obtained using different values of t. For example, if t=50%, the object is judged to pass inspection if the weighted median score is at least p. Weighted median is similar to weighted average, but with properties more appropriate in some cases. For higher values, for example t=90%, the object will be judged to pass inspection only if the overwhelming majority of the weight corresponds to active frames where the pass score is at least p. For t=100%, the object will be judged to pass inspection only if all of the active frames have a pass score that is at least p. The object may also be judged to pass inspection if $Q(p)$ is greater than 0, which means that any active frame has frame a pass score that is at least p.

In another useful variation, the object is judged to pass inspection based on the total weight where the pass score is at least p, instead of the fraction of total weight.

In an alternate embodiment, a percentile method is used based on a count of the frames where the pass score is at least p. This is equivalent to a weighted percentile method wherein all of the weights are equal.

The above descriptions of methods for weighing evidence to determine whether an object has been detected, and whether it passes inspection, are intended as examples of useful embodiments, but do not limit the methods that can be used within the scope of the Vision Detector Method and Apparatus. For example, the exemplary constants 0.5 used above may be replaced with any suitable value. Many additional methods for dynamic image analysis will occur to those skilled in the art.

Software Elements of the Vision Detector Method and Apparatus

Figure 9:
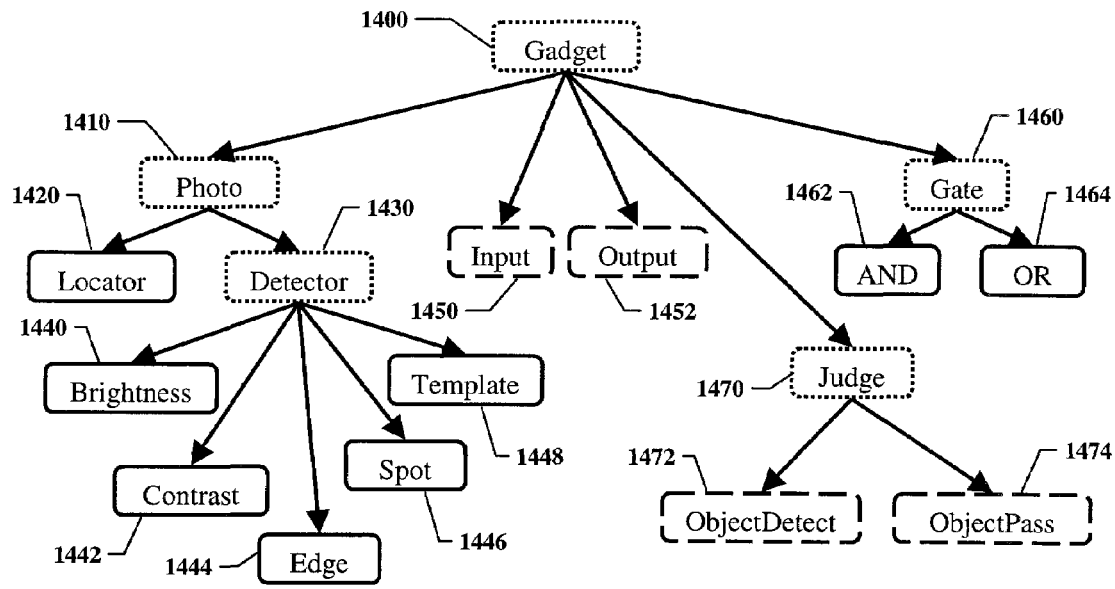
FIG. 9 shows the organization of a set of software elements (e.g., program instructions of a computer readable medium) used by an illustrative embodiment to analyze frames, make judgments, sense inputs, and control output signals.

FIG. 9 shows the organization of a set of software elements (e.g., program instructions of a computer readable medium) used by an illustrative embodiment to analyze frames, make judgments, sense inputs, and control output signals. The elements may be implemented using a class hierarchy in a conventional object-oriented programming language such as C++, so that each of the elements corresponds to a class. However, any acceptable programming technique and/or language can be used to carry out the processes described herein.

As illustrated, classes with a dotted border, such as Gadget class 1400, are abstract base classes that do not exist by themselves but are used to build concrete derived classes such as Locator class 1420. Classes with a solid border represent dynamic objects that can be created and destroyed as needed by the user in setting up an application, using an HMI 830. Classes with a dashed border, such as Input class 1450, represent static objects associated with specific hardware or software resources. Static objects always exist and cannot be created or destroyed by the user.

All classes are derived from Gadget class 1400, and so all objects that are instances of the classes shown in FIG. 9 are a kind of Gadget. In an illustrative embodiment, every Gadget:

1. has a name that can be chosen by the user;
2. has a logic output (a fuzzy logic value) that can be used as a logic input by other gadgets to make judgments and control output signals;
3. has a set of parameters than can be configured by a user to specify its operation;
4. has one such parameter that can be used to invert the logic output (i.e. fuzzy NOT); and
5. can be run, which causes its logic output to be updated based on its parameters, logic inputs if any, and for certain Gadgets the contents of the current frame, and which may also cause side-effects such as the setting of an output signal.

The act of analyzing a frame consists of running each Gadget once, in an order determined to guarantee that all logic inputs to a Gadget have been updated before the Gadget is run. In some embodiments, a Gadget is not run during a frame where its logic output is not needed.

The Photo class 1410 is the base class for all Gadgets whose logic output depends on the contents of the current frame. These are the classes that actually do the image analysis. Every Photo measures some characteristic of a region of interest (ROI) of the current frame. The ROI corresponds to a visible feature on the object to be inspected. This measurement is called the Photo's analog output. The Photo's logic output is computed from the analog output by means of a fuzzy threshold, called the sensitivity threshold, that is among its set of parameters that can be configured by a user. The logic output of a Photo can be used to provide evidence to be used in making judgments.

The Detector class 1430 is the base class for Photos whose primary purpose is to make measurements in an ROI and provide evidence to be used in making judgments. In an illustrative embodiment all Detector ROIs are circles. A circular ROI simplifies the implementation because there is no need to deal with rotation, and having only one ROI shape simplifies what the user has to learn. Detector parameters include the position and diameter of the ROI.

A Brightness Detector 1440 measures a weighted average or percentile brightness in the ROI. A Contrast Detector 1442 measures contrast in the ROI. An Edge Detector 1444 measures the extent to which the ROI looks like an edge in a specific direction. A Spot Detector 1446 measures the extent to which the ROI looks like a round feature such as a hole. A Template Detector 1448 measures the extent to which the ROI looks like a pre-trained pattern selected by a user. The operation of the Detectors is further described below and in the Vision Detector Method and Apparatus.

The Locator class 1420 represents Photos that have two primary purposes. The first is to produce a logic output that can provide evidence for making judgments, and in this they can be used like any Detector. The second is to determine the location of an object in the field of view of a vision detector, so that the position of the ROI of other Photos can be moved so as to track the position of the object. Any Locator can be used for either or both purposes.

In an illustrative embodiment, a Locator searches a one-dimensional search range in a frame for an edge. The search direction is normal to the edge, and is among the parameters to be configured by the user. The analog output of a Locator is similar to that for an Edge Detector. Locators are further described below and in the Vision Detector Method and Apparatus.

The Input class 1450 represents input signals to the vision detector, such as an external trigger. The Output class 1452 represents output signals from the vision detector, such as might be used to control a reject actuator. There is one static instance of the Input class for each physical input, such as exemplary input signal 926 (FIG. 5), and one static instance of the Output class for each physical output, such as exemplary output signals 922 and 924.

The Gate base class 1460 implements fuzzy logic decision making. Each Gate has one or more logic inputs than can be connected to the logic outputs of other Gadgets. Each logic input can be inverted (fuzzy NOT) by means of a parameter that a user can configure. An AND Gate 1462 implements a fuzzy AND operation, and an OR Gate 1464 implements a fuzzy OR operation.

The Judge class 1470 is the base class for two static objects, the ObjectDetect Judge 1472 and the ObjectPass Judge 1474. Judges implement dynamic image analysis by weighing evidence over successive frames to make the primary decisions. Each Judge has a logic input to which a user connects the logic output of a Photo or, more typically, a Gate that provides a logical combination of Gadgets, usually Photos and other Gates.

The ObjectDetect Judge 1472 decides if an object has been detected, and the ObjectPass Judge 1474 decides if it passes inspection. The logic input to the ObjectDetect Judge provides the object detection weight for each frame, and the logic input to the ObjectPass Judge provides the object pass score for each frame.

The logic output of the ObjectDetect Judge provides a pulse that indicates when a judgment has been made. In one mode of operation, called "output when processing", the leading edge of the pulse occurs when the inspection of an object begins, for example at the end of analysis step 540 in FIG. 2, and the trailing edge occurs when the inspection of an object is complete, for example at the end of analysis step 548. In another mode, called "output when done", the leading edge of the pulse occurs when the inspection of an object is complete, for example at the end of analysis step 548 in FIG. 2, and the trailing edge occurs some time after that, for example at the end of idle step 580.

The logic output of the ObjectPass Judge provides a level that indicates whether the most recently inspected object passed. The level changes state when the inspection of an object is complete, for example at the end of analysis step 548.

Figure 10:
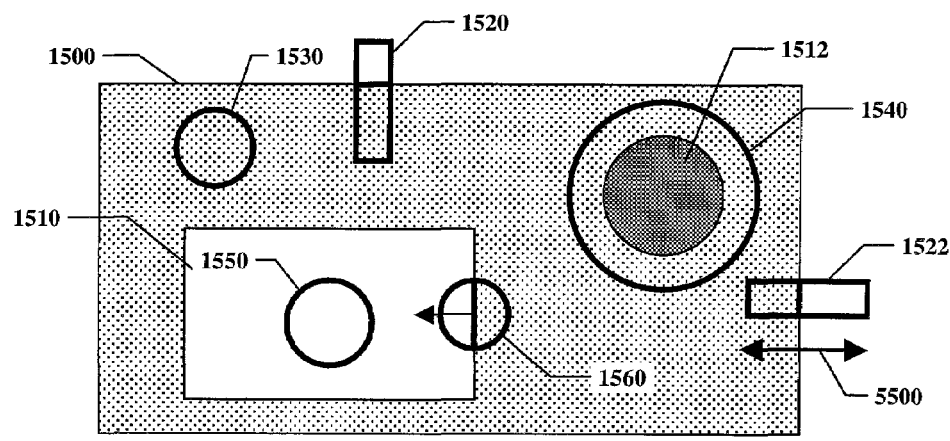
FIG. 10 shows a portion of an exemplary configuration of a vision detector that may be used to inspect an exemplary object.

FIG. 10 shows an example of how Photos can be used to inspect an object. FIG. 10 represents an image of object 110 (from FIG. 1), containing label feature 120 and hole feature 124, with superimposed graphics representing the Photos, and is displayed on an HMI 830 for a user to view and manipulate. A display of an image and superimposed graphics on an HMI is called an image view.

FIG. 10 represents an image view, showing an object 1500 containing a label 1510 and a hole 1512. The object in this example contains 6 visible features to be inspected, corresponding to the two Locators and four Detectors further described below.

A Locator 1520 is used to detect and locate the top edge of the object, and another Locator 1522 is used to detect and locate the right edge.

A Brightness Detector 1530 is used to help detect the presence of the object. In this example the background is brighter than the object, and the sensitivity threshold is set to distinguish the two brightness levels, with the logic output inverted to detect the darker object and not the brighter background.

Together the Locators 1520 and 1522, and the Brightness Detector 1530, provide the evidence needed to judge that an object has been detected, as further described below. By providing that evidence, there three Photos effectively determine the detection range of the vision detector, which is the portion of the field of view within which an object will be detected. Note that in the illustrated configuration, Brightness Detector 1530 does not actually constrain the detection range, although it could if it were placed closer to the edges of object 1500.

The detection range has a length in the direction of motion 5500, which in the illustrated configuration corresponds to the search range of Locator 1522 because that locator is oriented in the direction of motion and because Locator 1520 is orientated normal to the direction of motion. In general, the length in the direction of motion of the detection range is determined by the orientation and search range of all locators.

A Contrast Detector 1540 is used to detect the presence of the hole 1512. When the hole is absent the contrast would be very low, and when present the contrast would be much higher. A Spot Detector could also be used.

An Edge Detector 1560 is used to detect the presence and position of the label 1510. If the label is absent, mis-positioned horizontally, or significantly rotated, the analog output of the Edge Detector would be very low.

A Brightness Detector 1550 is used to verify that the correct label has been applied. In this example, the correct label is white and incorrect labels are darker colors.

As the object moves from left to right through the field of view of the vision detector, Locator 1522 tracks the right edge of the object and repositions Brightness Detector 1530, Contrast Detector 1540, Brightness Detector 1550, and Edge Detector 1560 to be at the correct position relative to the object. Locator 1520 corrects for any variation in the vertical position of the object in the field of view, repositioning the detectors based on the location of the top edge of the object. In general Locators can be oriented in any direction.

A user can manipulate Photos in an image view by using well-known HMI techniques. A Photo can be selected by clicking with a mouse, and its ROI can be moved, resized, and rotated by dragging. Additional manipulations for Locators are described in the Vision Detector Method and Apparatus.

Figure 11:
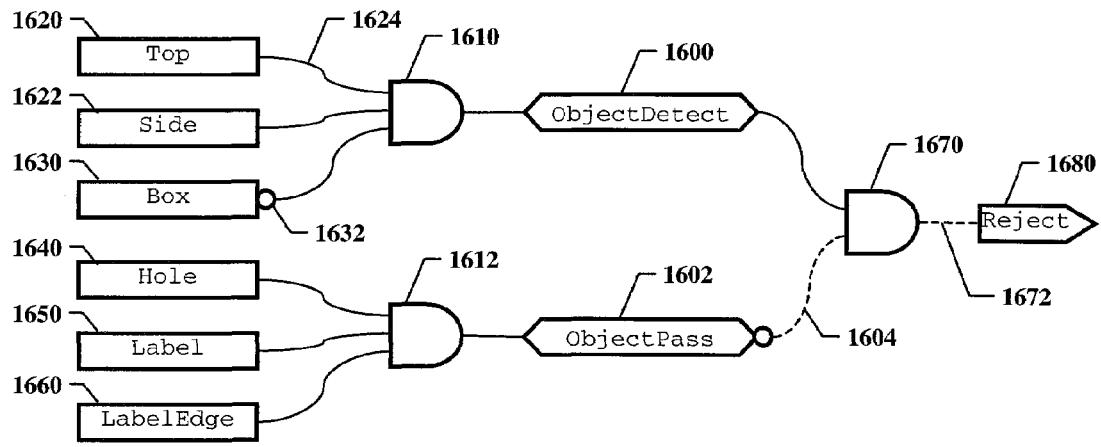
FIG. 11 shows another portion of the configuration corresponding to the exemplary setup of FIG. 10.

FIG. 11 shows a logic view containing a wiring diagram corresponding to the example setup of FIG. 10. A wiring diagram shows all Gadgets being used to inspect objects and interface to automation equipment, and the connections between logic inputs and outputs of the Gadgets. A wiring diagram is displayed on an HMI 830 for a user to view and manipulate. A display of gadgets and their logic interconnections on an HMI is called a logic view.

Referring still to the wiring diagram of FIG. 11, a Locator 1620 named "Top", corresponding to Locator 1520 in the image view of FIG. 10, is connected to AND Gate 1610 by wire 1624. Similarly, "Side" Locator 1622, corresponding to Locator 1522, and "Box" Detector 1630, corresponding to Brightness Detector 1530, are also wired to AND Gate 1610. The logic output of "Box" detector 1630 is inverted, as shown by the small circle 1632 and as described above to detect the darker object against a lighter background.

The logic output of AND Gate 1610 represents the level of confidence that the top edge of the object has been detected, the right edge of the object has been detected, and the background has not been detected. When confidence is high that all three conditions are true, confidence is high that the object itself has been detected. The logic output of AND Gate 1610 is wired to the ObjectDetect Judge 1600 to be used as the object detection weight for each frame.

Since the logic input to the ObjectDetect Judge in this case depends on the current frame, the vision detector is operating in visual event detection mode. To operate in external trigger mode, an Input Gadget would be wired to ObjectDetect. To operate in continuous analysis mode, nothing would be wired to ObjectDetect.

The choice of Gadgets to wire to ObjectDetect is made by a user based on knowledge of the application. In the example of FIGS. 10 and 11, a user may have determined that detecting just the top and right edges was not sufficient to insure that an object is present. Note that Locator 1522 might respond to the label's left edge just as strongly as the object's right edge, and perhaps at this point in the production cycle Locator 1520 might occasionally find some other edge in the background. By adding Detector 1530, and requiring all three conditions by means of AND Gate 1610, object detection is made reliable.

In the wiring diagram, Contrast Detector "Hole" 1640, corresponding to Contrast Detector 1540, Brightness Detector "Label" 1650, corresponding to Brightness Detector 1550, and Edge Detector "LabelEdge" 1660, corresponding to Edge Detector 1560, are wired to AND Gate 1612. The logic output of AND Gate 1612 represents the level of confidence that all three image features have been detected, and is wired to ObjectPass Judge 1602 to provide the object pass score for each frame.

The logic output of ObjectDetect Judge 1600 is wired to AND Gate 1670. The logic output of ObjectPass Judge 1602 is inverted and also wired to AND Gate 1670. The ObjectDetect Judge is set to "output when done" mode, so a pulse appears on the logic output of ObjectDetect Judge 1600 after an object has been detected and inspection is complete. Since the logic output of ObjectPass 1602 has been inverted, this pulse will appear on the logic output of AND Gate 1670 only if the object has not passed inspection. The logic output of AND Gate 1670 is wired to an Output gadget 1680, named "Reject", which controls an output signal from the vision detector than can be connected directly to a reject actuator 170. The Output Gadget 1680 is configured by a user to perform the appropriate delay 570 needed by the downstream reject actuator.

A user can manipulate Gadgets in a logic view by using well-known HMI techniques. A Gadget can be selected by clicking with a mouse, its position can be moved by dragging, and wires can be created by a drag-drop operation.

To aid the user's understanding of the operation of the vision detector, Gadgets and/or wires can change their visual appearance to indicate fuzzy logic values. For example, Gadgets and/or wires can be displayed red when the logic value is below 0.5, and green otherwise. In FIG. 11, wires 1604 and 1672 are drawn with dashed lines to indicate a logic value below 0.5, and other wires, for example wire 1624, are drawn solid to indicate logic values equal to or greater than 0.5.

One skilled in the art will recognize that a wide variety of objects can be detected and inspected by suitable choice, configuration, and wiring of Gadgets. One skilled in the art will also recognize that the Gadget class hierarchy is only one of many software techniques that could be used to practice the Vision Detector Method and Apparatus.

Methods for Locators

In some embodiments, a Locator searches a one-dimensional search range for an edge, using any of a variety of well-known techniques. The search direction is normal to the edge, and a Locator has a width parameter that is used to specify smoothing along the edge, which is used in well-known ways. The analog output of a Locator depends on the particular method used to search for the edge.

In an illustrative embodiment, a Locator searches a one-dimensional search range for an edge using the well-known method of computing a projection of the ROI parallel to the edge, producing a one-dimensional profile along the search range. The one-dimensional profile is convolved with a one-dimensional edge kernel, and the location of the peak response corresponds to the location of the edge. An interpolation, such as the well-known parabolic interpolation, can be used if desired to improve the edge location accuracy. In another embodiment, an edge can be located by searching for a peak analog output using the edge detector described in the Vision Detector Method and Apparatus, once again interpolating to improve accuracy if desired.

In some embodiments, a Locator searches a multi-dimensional search range, using well-known methods, that may include translation, rotation, and size degrees of freedom. Suitable methods include those based on normalized correlation, the generalized Hough transform, and geometric pattern patching, all of which are well-known in the art and have been commercially available for many years.

Figure 12:
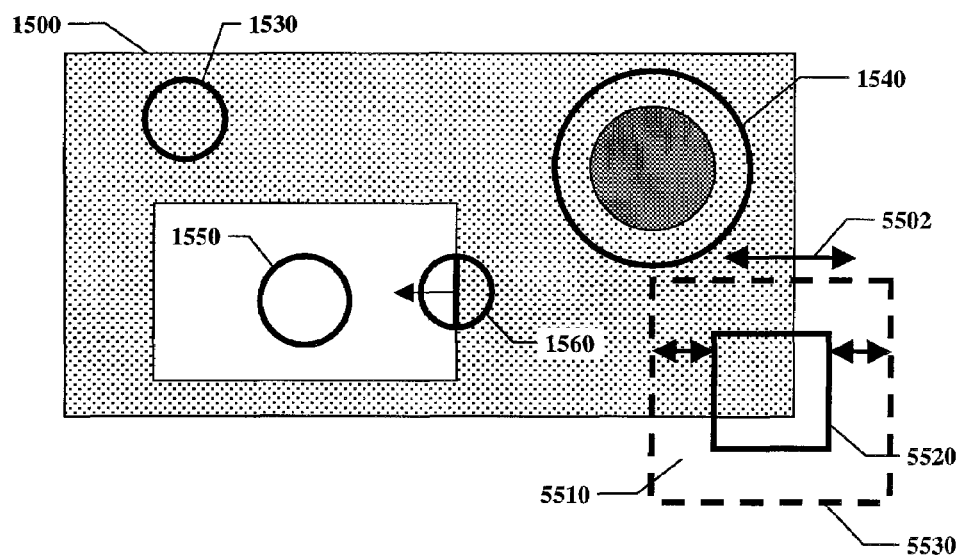
FIG. 12 illustrates the operation of a Locator that uses a multi-dimensional search range.

FIG. 12 shows an illustrative embodiment of a Locator 5510 that searches a multi-dimensional search range to locate object 1500. As part of configuring the vision detector, a user trains a pattern by choosing pattern window 5520. In the example of FIG. 12, the user has chosen a portion of the lower right corner of object 1500 as the pattern to train. A search window 5530 specifies the translation portion of the multi-dimensional search range within which to search for the pattern corresponding to pattern window 5520. The size and position of search window 5530 may be chosen by the user, or determined in whole or in part automatically, as further described below.

The search range may also include a rotation degree of freedom, not shown in the figure and specified by well-known means. Note that the particular pattern of FIG. 12 is not suitable for searching a size degree of freedom. As an alternative, two Locators each searching only the two translation degrees of freedom can be used to determine rotation and size following well-known methods.

In operation Locator 5510 searches within search window 5530 for the pattern specified by pattern window 5520 and repositions Brightness Detector 1530, Contrast Detector 1540, Brightness Detector 1550, and Edge Detector 1560 to be at the correct position relative to the object. The analog output of Locator 5510 is derived from a similarity score reported by the particular search method in use and well-known in the art.

Locator 5510 effectively determines the detection range of the vision detector in the illustrated configuration. As noted above, Brightness Detector 1530 does not actually constrain the detection range. The detection range has a length in the direction of motion 5502, which is determined by the difference between the size in the direction of motion of search window 5530 and pattern window 5520.

Detecting Objects Without Using Locators

Figure 13:
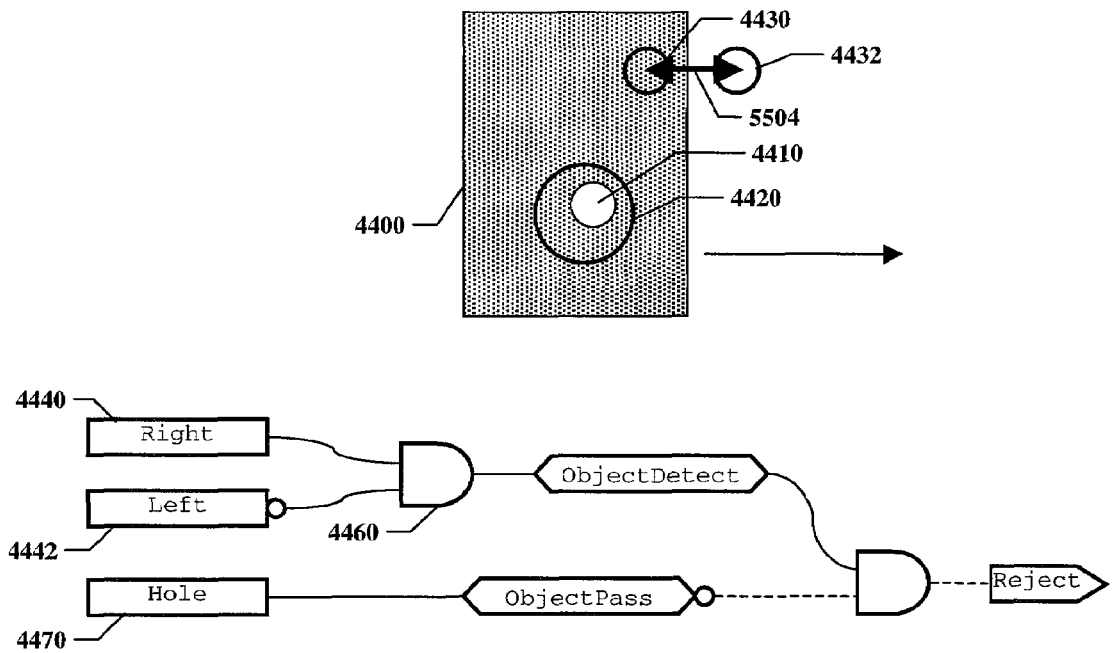
FIG. 13 illustrates one way to configure a vision detector to perform visual event detection without tracking the location of the object in the field of view.

FIG. 13 illustrates one way to configure the invention to operate in visual event detection mode without using Locators as input to the ObjectDetect Judge to determine active frames. An object 4400 containing a feature 4410 moves left to right in the FOV of a vision detector. Contrast Detector ROI 4420 is positioned to detect the presence of feature 4410. A left Brightness Detector ROI 4430 and a right Brightness Detector ROI 4432 are positioned to detect the object over a detection range in the FOV. The length in the direction of motion 5504 of the detection range is defined by the separation between left Brightness Detector ROI 4430 and right Brightness Detector ROI 4432.

A logic view shows "Right" Brightness Detector 4440 corresponding to right Brightness Detector ROI 4432, and "Left" Brightness Detector 4442 corresponding to left Brightness Detector ROI 4430. "Right" Brightness Detector 4440 produces a true logic output when object 4400 is not covering right Brightness Detector ROI 4432, because the background in this example is brighter than object 4400. "Left" Brightness Detector 4442 produces a true logic output when object 4400 is covering left Brightness Detector ROI 4430, because its output is inverted. Therefore AND Gate 4460 produces a true logic output when the right edge of object 4400 is between left Brightness Detector ROI 4430 and right Brightness Detector ROI 4432.

Note that the logic output of AND Gate 4460 is actually a fuzzy logic level that will fall between 0 and 1 when the right edge of object 4400 partially covers either ROI. Contrast Detector ROI 4420 must be large enough to detect feature 4410 over the detection range defined by the separation between left Brightness Detector ROI 4430 and right Brightness Detector ROI 4432, because since no locators are being used it will not be moved.

AND Gate 4460 is wired to the ObjectDetect Judge, and "Hole" Contrast Detector 4470, corresponding to Contrast Detector ROI 4420, is wired to the ObjectPass Judge. The Judges in this example are configured for visual event detection and direct control of a reject actuator.

Note that in the example of FIG. 13, a Locator could readily have been used instead of the pair of Brightness Detectors, because the right edge of object 4400 is relatively straightforward to locate. There will be applications, however, where locators may be difficult to use due to lack of clean edges, and where using some combination of Detectors would be advantageous.

The ObjectDetect Judge

Figure 14:
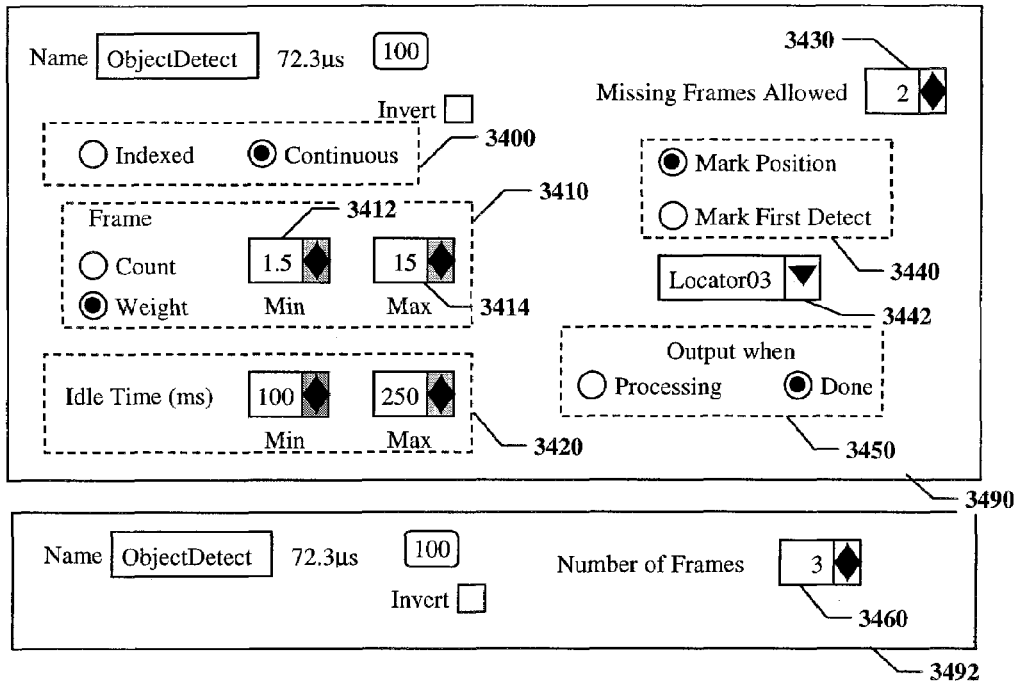
FIG. 14 shows a portion of the HMI for user configuration of object detection parameters.

FIG. 14 shows sets of graphical controls displayed on HMI 830 for viewing and setting parameters, called parameter views, for user configuration of the ObjectDetect Judge. A first parameter view 3490 is used for visual event detection mode, and a second parameter view 3492 is used for external trigger mode.

Presentation control 3400 allows selection of either indexed or continuous object presentation.

Frame filtering controls 3410 allow the user to set limits on the count or total object detection weight of active frames. Minimum frame spinner 3412 allows a user to choose the minimum required count or weight threshold, as explained above in the description of FIG. 7 where it refers to FIG. 14. Maximum frame spinner 3414 allows a user to choose a maximum frame count or weight, after which dynamic image analysis will terminate and a decision will be made regardless of how many more active frames may be found. This allows the user to limit the amount of time the invention will spend on one object, and is particularly useful for indexed or slow-moving objects.

Idle time controls 3420 allow a user to specify minimum and maximum times for idle step 580 (FIG. 2). If the minimum and maximum are equal, the idle time is fixed by the user. If the maximum is greater than the minimum, the vision detector can automatically choose a time within the specified range based on the measured rate at which objects are being presented, as described in the Vision Detector Method and Apparatus.

Missing frame spinner 3430 allows a user to specify the maximum number of consecutive inactive frames that will be accepted without terminating dynamic image analysis. Such a frame is illustrated by analysis step 542 in FIG. 2.

Marking control 3440 allows a user to select the marking mode. If marking by location is selected, the user must specify a Locator using locator list control 3442.

Output mode control 3450 allows a user to select the mode that defines when a pulse appears on the logic output.

Frame count spinner 3460 allows a user to select the number of frames to analyze in external trigger mode.

Operation of the Present Invention

Figure 15:
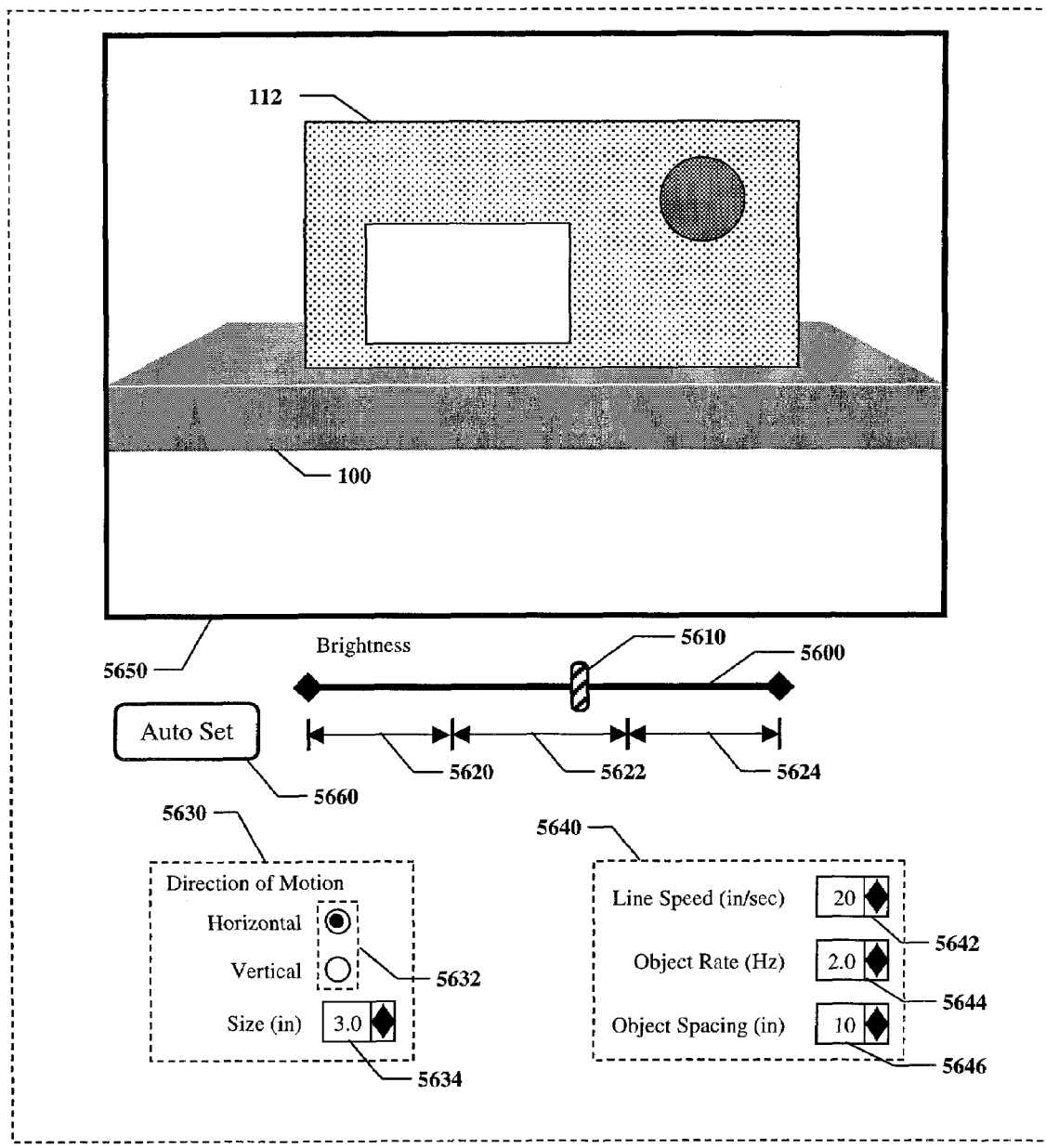
FIG. 15 illustrates an image view and a parameter view that is used in an illustrative embodiment to obtain production line and other information from a human user.

FIG. 15 illustrates an image view and a parameter view that is used in an illustrative embodiment to obtain pixel size, production line information, and an image brightness parameter from a human user, who may be a manufacturing engineer or technician not skilled in the art of the Vision Detector Method and Apparatus.

Pixel size information is provided by pixel size controls 5630. Direction controls 5632 allow the user to specify the direction of motion, from which the size in pixels of the field of view in the direction of motion can be determined. In an embodiment using the LM9630 imager, for example, the FOV is 128 pixels when the direction of motion is horizontal, and 100 pixels when it is vertical. FOV size spinner 5634 allows the user to estimate the size in physical units, for example inches or centimeters, of the field of view in the direction of motion. From these values the pixel size in physical units can be inferred. Note that precise values are not needed to practice the invention—the FOV size can be estimated by eye, by placing a ruler in the FOV, or by other well-known methods. The pixel size controls 5630 of FIG. 15 are intended to be illustrative only—it will be obvious that many alternate methods and structures can be used to obtain equivalent information.

Production line information is provided by production line controls 5640. Line speed spinner 5642 allows the user to estimate the nominal production line speed in physical units like inches/sec or centimeters/sec. Object rate spinner 5644 allows the user to estimate the nominal object frequency in physical units like Hertz (objects/sec). Note that one could equivalently provide a control to estimate the nominal object period in units of time, although a technician is more likely to know the object frequency than the period. Object spacing spinner 5646 allows the user to estimate the object-to-object spacing.

Note that only two of the three production line controls 5640 need be used, since from any two one can compute the third. In one embodiment, all three controls are provided and the user sets the two corresponding to information that is easiest to obtain. In another embodiment, two controls are provided, with the choice being made as appropriate for the intended applications. In an illustrative embodiment only line speed spinner 5642 is provided, so as to minimize the information that the user must obtain. With this embodiment, methods for setting vision detector parameters that do not rely on object frequency, period, or spacing are used, as described below.

An image brightness parameter is provided by brightness slider 5610, which a human user adjusts with reference to the image displayed in image view 5650. For illustrative purposes image view 5650 shows an image of the field of view as it might be found in FIG. 1, where object 112 and conveyer 100 can be seen. The user adjusts brightness slider 5610 to the right to make the image brighter and to the left to make the image darker, choosing a slider position wherein the various shades of gray that make up visible features in the field of view can reliably be distinguished. This task can readily be accomplished by technicians not skilled in the art of the Vision Detector Method and Apparatus, because human visual intuition is excellent.

Alternatively, auto-set button 5660 can be used to choose a brightness value automatically by well-known image analysis methods, for example by repeatedly adjusting the brightness value until a histogram of the image shows that the image gray values use most of the available range, without excessive saturation or cutoff. Brightness slider 5610 is adjusted to the value automatically chosen, after which the user can further adjust it if desired.

Brightness slider 5610 can be adjusted, manually or automatically, over a brightness range 5600 that represents the total dynamic range available by setting both the shutter time and the video gain parameters of the imager. In an illustrative embodiment, the left end of brightness range 5600 corresponds to image brightness parameter value of 0 and the minimum shutter time and video gain settings. The right end of brightness range 5600 corresponds to image brightness parameter value of 1 and the maximum shutter time and video gain settings.

As described in the Summary of the Invention and further described below, pixel size information, production line information, and internal parameters are used to determine the motion shutter time, which is an estimate of the longest shutter time that avoids excessive blurring. In the illustrative embodiment of FIG. 15, Brightness range 5600 is divided into three zones:

In the first brightness zone 5620, the desired shutter time is less than the motion shutter time and the desired gain is approximately equal to the minimum allowable gain value. This means that there is so much light that the shutter time has to be shorter than the motion shutter time to achieve suitable brightness.

In the second brightness zone 5622, the desired shutter time is approximately equal to the motion shutter time. This means that a value for the desired video gain can be found within its allowable range that provides the highest fidelity while avoiding excessive blurring.

In the third brightness zone 5624, the desired shutter time is greater than the motion shutter time and the desired gain is approximately equal to the maximum allowable gain value. This means that there is so little light that longer shutter times are needed, and the increased blurring will have to be tolerated.

Figure 16:
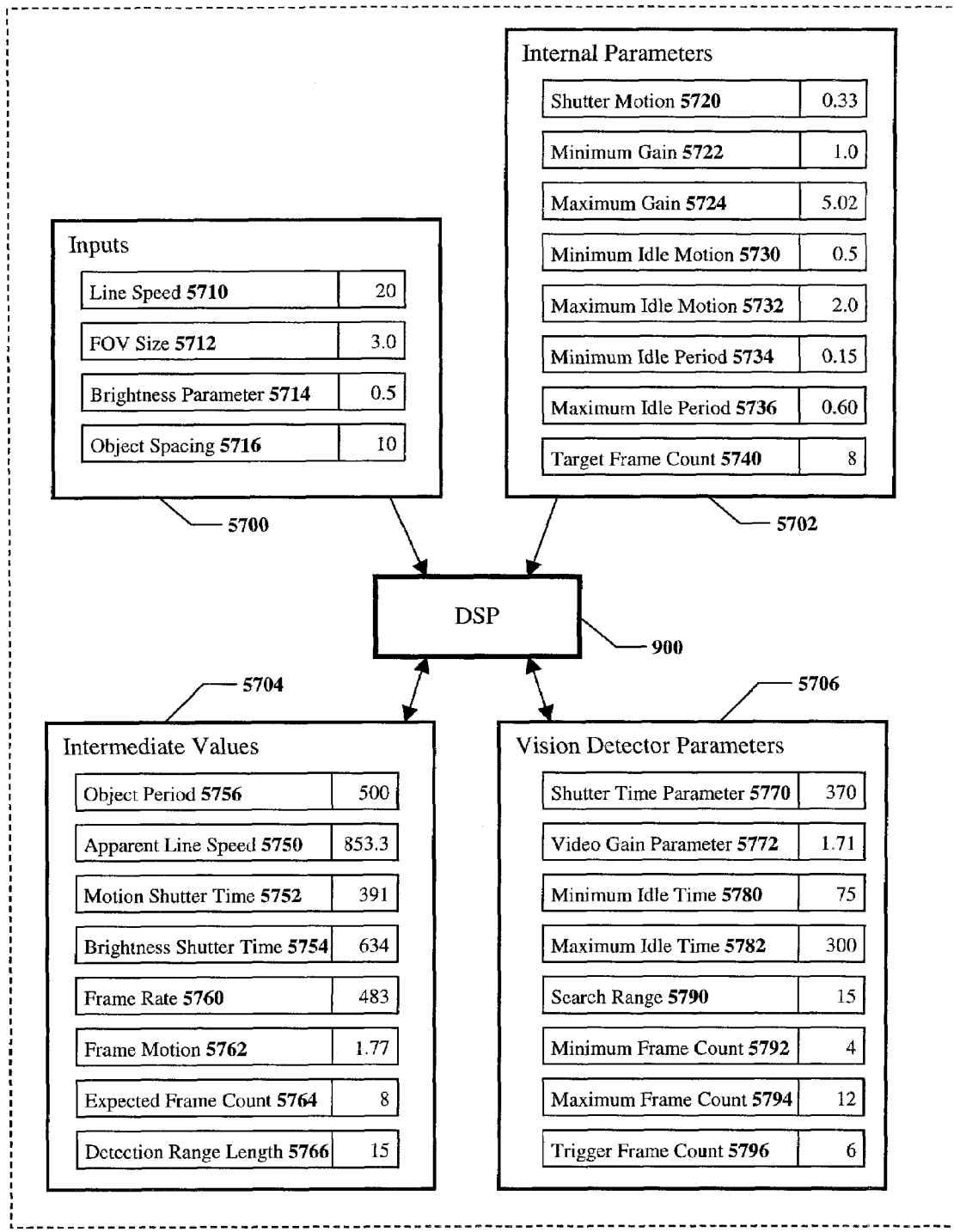
FIG. 16 described the details of an illustrative embodiment wherein a variety of vision detector parameters are determined from production line information.

FIG. 16 will be used to describe the details of an illustrative embodiment wherein a variety of vision detector parameters are determined from production line information. Input values 5700 are provided by a user interacting with an HMI as illustrated in FIG. 15 and described above. Internal parameters 5702 are built into the vision detector based on engineering choices made by a designer of ordinary skill in the art, following the teachings of the invention. Any of these internal parameters could also be entered using HMI 830. Other internal parameters used by the illustrative embodiment but not shown in FIG. 16 will also be described. Intermediate values 5704 are produced and used at various points, and vision detector parameters 5706 are computed and set.

Input values 5700, internal parameters 5702, intermediate values 5704, and vision detector parameters 5706 are stored in vision detector memory 910 (FIG. 5). DSP 900 receives input values 5700 from HMI 830, stores them in memory 910, and uses them along with internal parameters 5702 to compute intermediate values 5704 and vision detector parameters 5706. Shutter time parameter 5770 and video gain parameter 5772 are sent to imager 960 (FIG. 5); the other vision detector parameters are used by DSP 900 and remain in memory 910.

Line speed input 5710 comes from line speed spinner 5642. FOV size input 5712 comes from FOV size spinner 5634. Brightness parameter input 5714 comes from brightness slider 5610. Object spacing input 5716 comes from object spacing spinner 5646. The object frequency and period are not provided as inputs, since they can be computed from line speed input 5710 and object spacing input 5716. Instead compute object period value 5756 (500 ms.)=object spacing
 input 5716 (10 in)/line speed input 5710 (20
 in/sec).

In the illustrative embodiment, imager 960 is an LM9630 with field of view 128×100 pixels. The shutter time parameter can be set in the range 10-20,480 μs. The video gain parameter is set to one of 32 steps by an integer g in the range 0-31:

video gain=$1.1136^g$

Shutter motion parameter 5720 specifies that the production line should move no more than 0.33 pixels relative to the FOV during the shutter time to avoid excessive blurring. Apparent line speed value 5750 is estimated based on the nominal line speed:

apparent line speed value 5750 (853.3 pixels/sec)=line
 speed input 5710 (20 in/sec)×(128 pixels/FOV)/
 FOV size input 5712 (3 in/FOV).

In an alternative embodiment, not shown in FIG. 16, apparent line speed value 5750 is computed from object spacing input 5716 and an estimate of the nominal object frequency (for example from object rate spinner 5644) by computing line speed (20 in/sec)=object spacing input 5716 (10
 in)×object frequency (2 Hz)

and then using the above formula.
Compute:

motion shutter time value 5752 (391 μs)=shutter
 motion parameter 5720 (0.33 pixels)/apparent
 line speed value 5750 (853.3 pixels/sec).

The minimum allowable gain 5722 is 1.0 (g=0), and the maximum allowable gain 5724 is 5.023 (g=15). Note that even though the LM9630 allows much higher gain values to be used (up to 28.1, g=31) it is desirable to use a lower maximum limit to avoid signal distortion. In this illustrative embodiment, the shutter time is limited to the range 100-800 μs. The upper limit keeps the vision detector frame rate above 400 Hz. These limits imply that the brightness shutter time value 5754 must be in the range 100-4018 μs. Brightness parameter input 5714 is in the range 0-1, from which we compute brightness shutter time value 5754 (634 μs)=(100 μs)×
 $40.18^{brightness\ parameter\ input}$ 5714 (0.5)

With a motion shutter time value 5752 of 391 μs, a video gain of 1.621 would be needed to achieve a brightness shutter time value 5754 of 634 μs. Since this value is within the range specified by minimum allowable gain 5722 and maximum allowable gain 5724, the vision detector can operate in second brightness zone 5622 (FIG. 15). Video gain 1.621 corresponds to gain step g=4.49. Since the gain step must be an integer the next higher integer 5 is used, producing video gain parameter 5772 1.71. The brightness shutter time value 5754 of 634 μs is obtained by setting shutter time parameter 5770 to 370 μs, which is approximately equal to motion shutter time value 5752 of 391 μs. Note that by taking the next higher integer for the gain step, the shutter time parameter 5770 will not exceed the motion shutter time value 5752.

In has recently been found that some LM9630 imagers produce poor image quality when the video gain significantly exceeds 2. In another embodiment suitable for these imagers, not shown, maximum allowable gain 5724 is 2.124 (g=7), the shutter time range is 50-800 μs, and the brightness shutter time range is 50-1699 μs.

Minimum idle motion parameter 5730 specifies that an object should move at least 0.5 fields of view after being detected to avoid being detected more than once. Maximum idle motion parameter 5732 specifies that an object should move no more than 2.0 fields of view after being detected to avoid missing the next object. From these parameters compute:

minimum idle time 5780 (75 ms)=minimum idle
 motion parameter 5730 (0.5 FOV)×FOV size
 input 5712 (3 in/FOV)/line speed input 5710 (20
 in/sec)

maximum idle time 5782 (300 ms)=maximum idle
 motion parameter 5732 (2.0 FOV)×FOV size
 input 5712 (3 in/FOV)/line speed input 5710 (20
 in/sec)

In an alternate embodiment, minimum idle period parameter 5734 specifies that an object should move at least 0.15 object periods after being detected to avoid being detected more than once. Maximum idle period parameter 5736 specifies that an object should move no more than 0.60 object periods after being detected to avoid missing the next object. From these parameters compute:

minimum idle time 5780 (75 ms)=minimum idle period parameter 5734 (0.15)×object period value 5756 (500 ms)

maximum idle time 5782 (300 ms)=maximum idle period parameter 5736 (0.60)×object period value 5756 (500 ms)

Minimum idle time 5780 and maximum idle time 5782 can be used to set or provide default values for idle time controls 3420 (FIG. 14), to be used as described above.

Shutter time parameter 5770 of 370 μs gives a frame rate value 5760 of 483 Hz for the LM9630 (operating at the rated clock rate of 10 MHz). Compute:

frame motion value 5762 (1.77 pixels/frame)=apparent line speed value 5750 (853.3 pixels/sec)/ frame rate value 5760 (483 frames/sec)

Target frame count parameter 5740 specifies that it is desirable that 8 frames be analyzed to inspect the object following the teachings of dynamic image analysis. At 1.77 pixels/frame an object will move 14.13 pixels during 8 frames. Rounding up to the next higher integer, a detection range whose length in the direction of motion is 15 pixels would allow about 8 frames to be analyzed. The length value is adjusted if necessary to fall within a reasonable range, for example 4-32 pixels, and search range parameter 5790 of a Locator is set accordingly. For Locator 1522 (FIG. 10), search range parameter 5790 is set to 15. For Locator 5510 (FIG. 12), the size of search window 5530 in the direction of motion is set to the size of pattern window 5520 in the direction of motion, plus search range parameter 5790, minus 1.

In the illustrative embodiment, detection range length value 5766 (the length in the direction of motion of the detection range) is equal to search range parameter 5790. As discussed above, the length in the direction of motion of the detection range can be determined in a variety of other ways.

The frame count parameters for visual event detection mode and external trigger mode are computed as follows:

expected frame count value 5764 (8 frames)=floor [detection range length value 5766 (15 pixels)/ frame motion value 5762 (1.77 pixels/frame)]

minimum frame count parameter 5792 (4 frames) =floor[0.5×expected frame count value 5764 (8 frames)]

maximum frame count parameter 5794 (12 frames) =ceiling[1.5×expected frame count value 5764 (8 frames)]

trigger frame count parameter 5796 (6 frames)=round [0.8×expected frame count value 5764 (8 frames)]

The 0.5, 1.5, and 0.8 constants are internal parameters not shown in FIG. 16. These constants reflect the following engineering judgments:

At least half (0.5) of the expected number of frames must be found to contain sufficient evidence that an object is present in the FOV in order to judge that an object has been detected.

Dynamic image analysis may be terminated and a decision made when 1.5 times the number of expected frames have been analyzed.

When using an external trigger, analyze slightly less than (0.8) the number of expected frames, to avoid analyzing frames where the object may have moved beyond the detection range.

Note that if all pixel size and production line information were known perfectly, and if object appearance were always reliable in all viewing perspectives within the detection range, then all of these parameters could be set to 1.0 so that all of the frames count parameters would be equal to the expected number of frames. The actual values used above reflect the fact that in practice production conditions and pixel size are only estimated and may differ from nominal values, and object appearance may not be reliable at all viewing perspectives within the detection range. Clearly other values for these constants may be desirable for specific applications. Note further that these comments apply equally to many parameter choosing tasks, such as the idle period and idle motion internal parameters.

Minimum frame count parameter 5792 can be used to set or provide a default value for minimum frame spinner 3412 (FIG. 14), maximum frame count parameter 5794 can be used to set or provide a default value for maximum frame spinner 3414, and trigger frame count parameter 5796 can be used to set or provide a default value for frame count spinner 3460, to be used as described above.

The functions floor (next lower integer), ceiling (next higher integer), and round (closest integer) have their conventional meaning.

Figure 17:
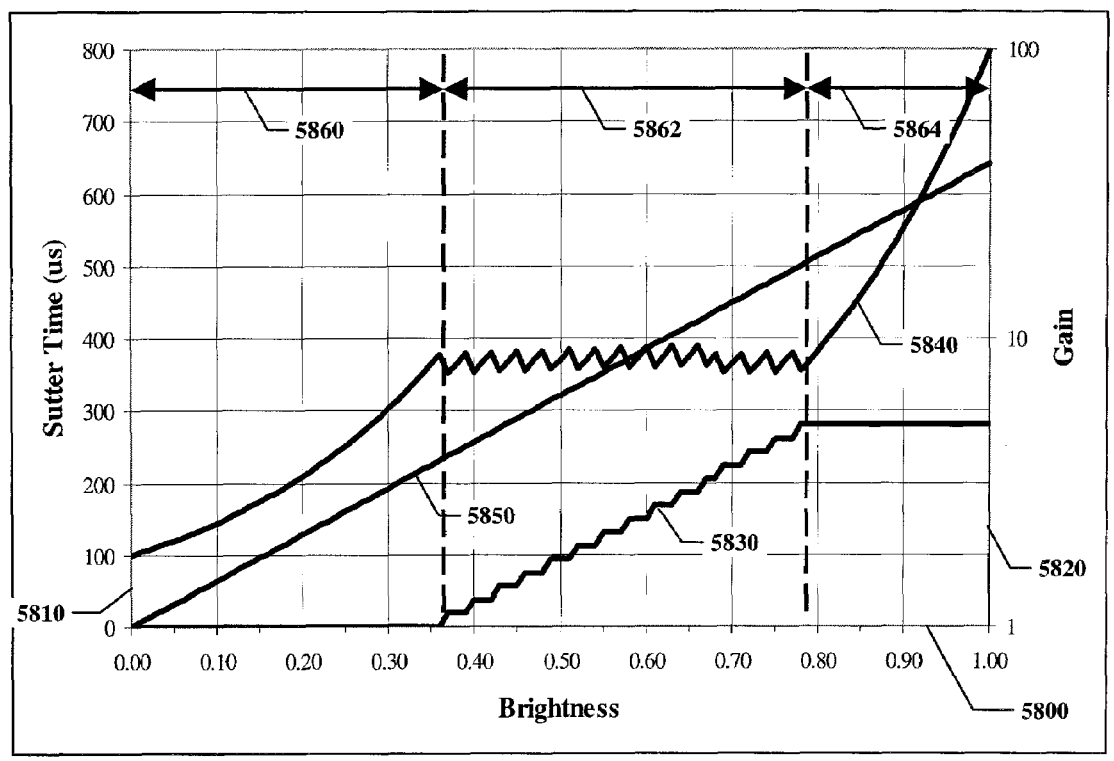
FIG. 17 plots shutter time and video gain as a function of the brightness parameter for an illustrative embodiment.

FIG. 17 shows shutter time parameter 5770 and video gain parameter 5772 as a function of brightness parameter 5714 for the illustrative embodiment of FIGS. 15 and 16. Brightness parameter 5714 is plotted on horizontal axis 5800 over the range 0-1, and corresponds to brightness slider 5610 and brightness range 5600. Shutter time parameter 5770 is plotted on left vertical axis 5810, and video gain parameter 5772 is plotted on a logarithmic scale on right vertical axis 5820.

Shutter time plot 5840 corresponds to shutter time parameter 5770, and video gain plot 5830 corresponds to video gain parameter 5772. Note that video gain plot 5830 shows a stair-step characteristic because the imager uses discrete gain steps, and shutter time plot 5840 shows a wiggle characteristic that compensates for the discrete gain steps. This compensation is seen in total gain plot 5850, also plotted on a logarithmic scale on right vertical axis 5820, which is a straight line. Here total gain is brightness shutter time value 5754 divided by its minimum value.

First brightness range 5860 corresponds to first brightness zone 5620, second brightness range 5862 corresponds to second brightness zone 5622, and third brightness range 5864 corresponds to third brightness zone 5624.

The foregoing has been a detailed description of illustrative embodiments of the invention. Various modifications and additions can be made without departing from the sprit and scope thereof. For example, other graphical controls can be used, other inputs for production line information can be used, and other choices for internal parameter values can be made. Furthermore, in any place where the nominal object period or frequency is used it can be measured by the vision detector during operation following the teachings in the Vision Detector and Apparatus, instead of being estimated by a manufacturing technician. In addition, the teachings detailed above in reference to FIG. 5 on engineering tradeoffs for efficient operation of a vision detector are useful in choosing parameter values and alternative methods within the scope of the invention. Accordingly, this description is meant to be taken only by way of example, and not to otherwise limit the scope of the invention.

We claim:

1. A method for setting a shutter time parameter and a gain parameter of an imager, the gain parameter having a minimum allowable gain value and a maximum allowable gain value, comprising:

configuring the imager to capture images of a field of view of a production line in relative motion with respect to the field of view in a direction and at a nominal line speed, the field of view having a size in the direction of motion of the production line;

choosing a motion parameter that specifies a desired relative motion of the production line, in units related to pixels, during an interval specified by the shutter time parameter;

estimating, responsive to the nominal line speed, an apparent line speed in units related to pixels per unit of time;

computing, responsive to the apparent line speed and the motion parameter, a motion shutter time;

inputting a desired image brightness parameter;

computing, responsive to the desired image brightness parameter, a brightness shutter time;

computing a desired shutter time and a desired gain, such that the brightness shutter time is approximately equal to the product of the desired shutter time and the desired gain, the desired gain is not less than the minimum allowable gain value and not greater than the maximum allowable gain value, and at least one of a first condition, a second condition, and a third condition hold, wherein the first condition holds when the desired shutter time is approximately equal to the motion shutter time, the second condition holds when the desired shutter time is less than the motion shutter time and the desired gain is approximately equal to the minimum allowable gain value, and the third condition holds when the desired shutter time is greater than the motion shutter time and the desired gain is approximately equal to the maximum allowable gain value; and setting the shutter time parameter of the imager to the desired shutter time, and the gain parameter of the imager to the desired gain.

2. The method of claim 1, wherein the step of estimating the apparent line speed comprises inputting estimates of at least one production line value comprising information about physical attributes of the production line;

inputting an estimate of the size of the field of view in the direction of motion of the production line; and computing, responsive to the estimates of the at least one production line value and the estimate of the size of the field of view, the apparent line speed.

3. The method of claim 2, wherein the at least one production line value comprises the nominal line speed.

4. The method of claim 2, wherein the production line contains a sequence of discrete objects at a nominal object spacing, such that the objects move passed the imager at a nominal object frequency; and the at least one production line value comprises the nominal object frequency and the nominal object spacing.

* * * * *